United States Patent
Roundy et al.

(10) Patent No.: US 9,256,739 B1
(45) Date of Patent: *Feb. 9, 2016

(54) SYSTEMS AND METHODS FOR USING EVENT-CORRELATION GRAPHS TO GENERATE REMEDIATION PROCEDURES

(71) Applicant: Symantec Corporation, Mountain View, CA (US)

(72) Inventors: Kevin Alejandro Roundy, El Segundo, CA (US); Sandeep Bhatkar, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/221,703

(22) Filed: Mar. 21, 2014

(51) Int. Cl.
*G06F 21/55* (2013.01)
*H04L 29/06* (2006.01)
*G06F 21/56* (2013.01)
(Continued)

(52) U.S. Cl.
CPC .............. *G06F 21/554* (2013.01); *G06F 21/54* (2013.01); *G06F 21/552* (2013.01); *G06F 21/566* (2013.01); *H04L 41/0631* (2013.01); *H04L 63/1425* (2013.01)

(58) Field of Classification Search
CPC ... G06F 21/554; G06F 21/566; G06F 21/552; G06F 21/54; H04L 63/1425; H04L 41/0631
See application file for complete search history.

(56) References Cited

U.S. PATENT DOCUMENTS

| | | | |
|---|---|---|---|
| 7,861,300 B2 * | 12/2010 | Arnold | G06F 21/566 713/188 |
| 8,104,090 B1 | 1/2012 | Pavlyushchik | |
| 8,341,745 B1 | 12/2012 | Chau et al. | |

(Continued)

FOREIGN PATENT DOCUMENTS

| | | |
|---|---|---|
| CN | 102571469 | 7/2012 |
| CN | 102893289 | 1/2013 |

(Continued)

OTHER PUBLICATIONS

Constantin, "Attackers used known exploit to steal customer log-in credentials, vBulletin maker says" Nov. 2013 http://www.networkworld.com/article/2171967/access-control/attackers-used-known-exploit-to-steal-customer-log-in-credentials--vbulletin-maker-sa.html.*

(Continued)

*Primary Examiner* — Jung Kim
*Assistant Examiner* — Carlos M De Jesus Lassala
(74) *Attorney, Agent, or Firm* — ALG Intellectual Property, LLC

(57) ABSTRACT

A computer-implemented method for using event-correlation graphs to generate remediation procedures may include (1) detecting a suspicious event involving a first actor within a computing system, (2) constructing, in response to detecting the suspicious event involving the first actor, an event-correlation graph that includes (i) a first node that represents the first actor, (ii) a second node that represents a second actor, and (iii) an edge that interconnects the first node and the second node and represents an additional suspicious event involving the first actor and the second actor, and (3) using the event-correlation graph to generate a procedure for remediating an effect of an attack on the computing system that is reflected in the event-correlation graph. Various other methods, systems, and computer-readable media are also disclosed.

20 Claims, 12 Drawing Sheets

(51) Int. Cl.
   *H04L 12/24* (2006.01)
   *G06F 21/54* (2013.01)

(56) References Cited

U.S. PATENT DOCUMENTS

| | | | | |
|---|---|---|---|---|
| 8,566,938 | B1* | 10/2013 | Prakash | H04L 63/1483 726/22 |
| 2005/0138413 | A1 | 6/2005 | Lippmann et al. | |
| 2009/0144308 | A1* | 6/2009 | Huie | H04L 63/1483 |
| 2010/0186088 | A1 | 7/2010 | Banerjee et al. | |
| 2010/0192226 | A1 | 7/2010 | Noel et al. | |
| 2010/0235879 | A1* | 9/2010 | Burnside | H04L 63/1425 726/1 |
| 2011/0047620 | A1* | 2/2011 | Mahaffey | G06F 21/564 726/23 |
| 2011/0083180 | A1 | 4/2011 | Mashevsky et al. | |
| 2011/0252032 | A1* | 10/2011 | Fitzgerald | H04L 63/20 707/737 |
| 2012/0137367 | A1* | 5/2012 | Dupont | G06F 21/00 726/25 |
| 2013/0042294 | A1* | 2/2013 | Colvin | G06F 21/53 726/1 |
| 2013/0246605 | A1* | 9/2013 | Mahadik | H04L 63/1433 709/224 |
| 2013/0333032 | A1* | 12/2013 | Delatorre | H04L 63/1441 726/23 |
| 2014/0283026 | A1* | 9/2014 | Striem Amit | H04L 63/1416 726/22 |
| 2014/0310808 | A1* | 10/2014 | Yao | G06F 21/316 726/22 |
| 2014/0365646 | A1* | 12/2014 | Xiong | H04L 63/101 709/224 |
| 2015/0047026 | A1* | 2/2015 | Neil | H04L 63/1425 726/22 |

FOREIGN PATENT DOCUMENTS

| | | | |
|---|---|---|---|
| CN | 20130222345 | * | 6/2013 |
| EP | 2515250 | | 10/2012 |

OTHER PUBLICATIONS

Eberle et al., "Insider Threat Detection Using graph-Based Appraoches" Jan. 2009, pp. 237-241 http://www.eecs.wsu.edu/~holder/pubs/EberleCATCH09.pdf.*
Dell, "Recovery Manager for Active Directory Forest Edition" Nov. 2013, pp. 1-2 http://software.dell.com/documents/recovery-manager-for-active-directory-forest-edition-datasheet-26622.pdf.*
Scarfone et al., "Guide to Instrusion Detection and Prevention Systems (IDPS)", Feb. 2007, pp. 1-127 http://csrc.nist.gov/publications/nistpubs/800-94/SP800-94.pdf.*
Constantin, "Attackers used known exploit to steal customer log-in credentials, vBulletin maker says" Nov. 2013 http://www.networkworld.com/article/2171967/access-control/attackers-used-known-exploit-to-steal-customer-log-in-credentials-vbulletin-maker-sa.html.*
Adam Glick, et al; Systems and Methods for User-Directed Malware Remediation; U.S. Appl. No. 13/419,360, filed Mar. 13, 2012.
Bruce McCorkendale, et al; Systems and Methods for Detecting Malware; U.S. Appl. No. 13/422,702, filed Mar. 16, 2012.
Kevin Roundy, et al; Systems and Methods for Using Event-Correlation Graphs to Detect Attacks on Computing Systems; U.S. Appl. No. 14/041,762, filed Sep. 30, 2013.
Fanglu Guo, et al; Systems and Methods for Reducing False Positives When Using Event-Correlation Graphs to Detect Attacks on Computing Systems; U.S. Appl. No. 14/031,044, filed Sep. 19, 2013.
Carey Nachenberg, et al; Systems and Methods for Neutralizing File-Format-Specific Exploits Included Within Files Contained Within Electronic Communications; U.S. Appl. No. 13/418,332, filed Mar. 12, 2012.
Leylya Yumer, et al; Systems and Methods for Analyzing Zero-Day Attacks; U.S. Appl. No. 13/901,977, filed May 24, 2013.
Lee, Kyumin et al., "Content-Driven Detection of Campaigns in Social Media", http://faculty.cs.tamu.edu/caverlee/pubs/lee11cikm.pdf, as accessed Aug. 8, 2013, CIKM'11; ACM; Glasgow, Scotland, UK, (Oct. 2011).
Bhuyan, Monowar H., et al., "AOCD: An Adaptive Outlier Based Coordinated Scan Detection Approach", http://www.cs.uccs.edu/~jkalita/papers/2012/BhuyanMonowarIJNS2012.pdf, as accessed Aug. 8, 2013, International Journal of Network Security; vol. 14, No. 6, (Nov. 2012), 339-351.
Eberle, William et al., "Graph-based approaches to insider threat detection", http://dl.acm.org/citation.cfm?id=1558658, as accessed Aug. 8, 2013, CSIIRW '09 Proceedings of the 5th Annual Workshop on Cyber Security and Information Intelligence Research: Cyber Security and Information Intelligence Challenges and Strategies; Article No. 44; ACM; (2009).
Splunk, Inc., "Detecting Advanced Persistent Threats—Using Splunk for APT", http://www.splunk.com/web_assets/pdfs/secure/Splunk_for_APT_Tech_Brief.pdf, as accessed Aug. 8, 2013, Tech Brief, (Jan. 4, 2012).
Triumfant, Inc., "Detecting the Advanced Persistent Threat", www.triumfant.com/advanced_persistent_threat.asp, as accessed Aug. 8, 2013, (Nov. 30, 2010).
EMC Corporation, "Advanced Persistent Threat (APT) and Rootkit Detection", http://www.siliciumsecurity.com/advanced-persistent-threats-and-rootkits-detection/, as accessed Aug. 8, 2013, (2012).
Colombe, Jeffrey B., et al., "Statistical profiling and visualization for detection of malicious insider attacks on computer networks", http://dl.acm.org/citation.cfm?id=1029231, as accessed Nov. 13, 2013, VizSEC/DMSEC '04 Proceedings of the 2004 ACM workshop on Visualization and data mining for computer security, ACM, New York, NY, (2004),138-142.
Wang, Wei et al., "Diffusion and graph spectral methods for network forensic analysis", http://dl.acm.org/citation.cfm?id=1278956, as accessed Nov. 13, 2013, NSPW '06 Proceedings of the 2006 workshop on New security paradigms, ACM, New York, NY, (2006), 99-106.
Julisch, Klaus, "Clustering intrusion detection alarms to support root cause analysis", http://dl.acm.org/citation.cfm?id=950192, as accessed Nov. 13, 2013, ACM Transactions on Information and System Security (TISSEC), vol. 6, Issue 4, ACM, New York, NY, (Nov. 2003), 443-471.
Treinen, James J., et al., "A framework for the application of association rule mining in large intrusion detection infrastructures", http://dl.acm.org/citation.cfm?id=2166375, as accessed Nov. 13, 2013, RAID'06 Proceedings of the 9th international conference on Recent Advances in Intrusion Detection, Springer-Verlag Berlin, Heidelberg ,(2006), 1-18.
Gu, Guofei et al., "BotHunter: detecting malware infection through IDS-driven dialog correlation", http://dl.acm.org/citation.cfm?id=1362915, as accessed Nov. 13, 2013, SS'07 Proceedings of 16th USENIX Security Symposium on USENIX Security Symposium, Article No. 12, USENIX Association, Berkeley, CA, (2007).
Valdes, Alfonso et al., "Probabilistic Alert Correlation", http://dl.acm.org/citation.cfm?id=670734, as accessed Nov. 13, 2013, RAID '00 Proceedings of the 4th International Symposium on Recent Advances in Intrusion Detection, Springer-Verlag, London, UK, (2001), 54-68.
Alsubhi, Khalid et al., "FuzMet: a fuzzy-logic based alert prioritization engine for intrusion detection systems", http://dl.acm.org/citation.cfm?id=2344711, as accessed Nov. 13, 2013, International Journal of Network Management, vol. 22 Issue 4, John Wiley & Sons, Inc., New York, NY, (Jul. 2012).
Zamlot, Loai et al., "Prioritizing intrusion analysis using Dempster-Shafer theory", http://dl.acm.org/citation.cfm?id=2046694, as accessed Nov. 13, 2013, AISec '11 Proceedings of the 4th ACM workshop on Security and artificial intelligence, ACM, New York, NY, (2011), 59-70.
Oliner, Adam J., et al., "Community epidemic detection using time-correlated anomalies", http://dl.acm.org/citation.cfm?id=1894191, as accessed Nov. 13, 2013, RAID'10 Proceedings of the 13th international conference on Recent advances in intrusion detection, Springer-Verlag Berlin, Heidelberg, (2010), 360-381.

(56) References Cited

OTHER PUBLICATIONS

Ning, Peng et al., "Constructing attack scenarios through correlation of intrusion alerts", http://reeves-students.csc.ncsu.edu/papers-and-other-stuff/2002-10-ccs-constructing-attack-scenarios-paper.pdf, as accessed Nov. 13, 2013, CCS '02 Proceedings of the 9th ACM conference on Computer and communications security, ACM, Washington, DC, (Nov. 18-22, 2002), 245-254.

Wang, Wei et al., "A Graph Based Approach Toward Network Forensics Analysis", http://dl.acm.org/citation.cfm?id=1410238, as accessed Nov. 13, 2013, ACM Transactions on Information and System Security (TISSEC), vol. 12, Issue 1, Article No. 4, ACM, New York, NY, (Oct. 2008).

Valeur, Fredrik et al., "A Comprehensive Approach to Intrusion Detection Alert Correlation", http://dl.acm.org/citation.cfm?id=1038251, as accessed Nov. 13, 2013, IEEE Transactions on Dependable and Secure Computing, vol. 1, Issue 3, IEEE Computer Society Press, Los Alamitos, CA, (Jul. 2004), 146-169.

Tedesco, Gianni et al., "Real-Time Alert Correlation with Type Graphs", http://dl.acm.org/citation.cfm?id=1496279, as accessed Nov. 13, 2013, ICISS '08 Proceedings of the 4th International Conference on Information Systems Security, Springer-Verlag Berlin, Heidelberg, (2008), 173-187.

Wang, Wei et al., "Network Forensics Analysis with Evidence Graphs", http://www.dfrws.org/2005/proceedings/wang_evidencegraphs.pdf, as accessed Nov. 13, 2013, 2005 Digital Forensic Research Workshop (DFRWS), New Orleans, LA, (2005).

Wang, Ting et al., "Microscopic Social Influence", http://www.cc.gatech.edu/~lingliu/papers/2012/TingWang-SDM2012.pdf, as accessed Nov. 13, 2013, SDM 2012, (2012).

Ugander, Johan et al., "Balanced Label Propagation for Partitioning Massive Graphs", https://people.cam.cornell.edu/~jugander/papers/wsdm13-blp.pdf, as accessed Nov. 13, 2013, WSDM'13, ACM, Rome, Italy, (Feb. 4-8, 2013).

Ayday, Erman et al., "Iterative Trust and Reputation Management Using Belief Propagation", http://www.ece.gatech.edu/research/labs/WCCL/BP_publications/BP-ITRM-journal.pdf, as accessed Nov. 13, 2013, IEEE Transactions on Dependable and Secure Computing, vol. 9, No. 3, IEEE Computer Society, (May/Jun. 2012), 375-386.

ACAR Tamersoy, et al; Systems and Methods for Adjusting Suspiciousness Scores in Event-Correlation Graphs; U.S. Appl. No. 14/138,891, filed Dec. 23, 2013.

Paleari, Roberto et al., "Automatic Generation of Remediation Procedures for Malware Infections", https://www.usenix.org/legacy/event/sec10/tech/full_papers/Paleari.pdf, as accessed Feb. 6, 2014, USENIX Security'10 Proceedings of the 19th USENIX conference on Security, USENIX Association, Berkeley, CA, (2010).

"Combating Advanced Persistent Threats—How to prevent, detect, and remediate APTs", http://www.mcafee.com/us/resources/white-papers/wp-combat-advanced-persist-threats.pdf, as accessed Feb. 6, 2014, McAfee, Inc., Santa Clara, CA, (2011).

"Advanced Persistent Threat (APT) Attack & Zero-Day Protection", http://www.fireeye.com/, as accessed Feb. 6, 2014, FireEye, Inc., (2006).

"Advanced Threat Defense", http://www.fidelissecurity.com/advanced-persistent-threat-protection, as accessed Feb. 6, 2014, General Dynamics Fidelis Cybersecurity Solutions, Inc., (2013).

"Mandiant for Security Operations", https://www.mandiant.com/products/mandiant-platform/security-operations, as accessed Feb. 6, 2014, Mandiant, A FireEye Company, (Mar. 1, 2013).

"Mandiant for Intelligent Response", http://www.mandiant.com/products/mandiant-platform/intelligent-response, as accessed Feb. 6, 2014, Mandiant, A FireEye Company, (Mar. 1, 2013).

"Solera Networks Inc.", http://www.soleranetworks.com/, as accessed Feb. 6, 2014, (Feb. 16, 2005).

"LogRhythm, Inc.", http://www.logrhythm.com/, as accessed Feb. 6, 2014, (Oct. 18, 2000).

Dezert, Jean et al., "On the Validity of Dempster-Shafer Theory", Fusion 2012—15th International Conference on Information Fusion, Singapour, Singapore, (Jul. 2012).

\* cited by examiner

SYSTEMS AND METHODS FOR USING EVENT-CORRELATION GRAPHS TO GENERATE REMEDIATION PROCEDURES

BACKGROUND

In recent years, malicious programmers have created a variety of sophisticated targeted attacks aimed at high-profile or high-level entities, such as governments, corporations, political organizations, defense contractors, or the like. In many cases, the goal of such targeted attacks is to gain access to highly sensitive or confidential information, such as security credentials, financial information, defense-related information, and/or intellectual property (e.g., source code), and/or to simply disrupt an entity's operations.

Many security software companies attempt to combat targeted attacks by creating and deploying malware signatures (e.g., hash functions that uniquely identify known malware) to their customers on a regular basis. However, a significant number of the above-mentioned attacks involve malware that has been carefully crafted to take advantage of an as-yet-undiscovered vulnerability of a particular application (commonly known as a "zero-day" exploit). As such, these attacks are often difficult for traditional security software to detect and/or neutralize since the exploits in question have yet to be publicly discovered. Moreover, in addition to malware, many targeted attacks may perform malicious activities using benign software and/or the actions of authorized users, which are generally not detected by typical malware signatures.

In addition to or as an alternative to a signature-based approach, some security software companies may apply a variety of behavior-based heuristics to detect targeted attacks. Unfortunately, a significant number of targeted attacks (e.g., advanced persistent threats) may move at a slow pace such that traditional security software may be unable to distinguish individual malicious behaviors of the targeted attacks from legitimate behaviors.

After detecting an attack on a computing system, traditional security software may recommend various procedures for remediating the effects of the attack on the computing system. In some instances, traditional security software may generate procedures for remediating predicted effects of an attack by (1) analyzing the impact of malware used in the attack on an isolated computing system purposely built for analyzing malware and (2) generating procedures for reversing the impact of the malware.

Unfortunately, remediation procedures generated in this way may have limited utility for at least the reason that (1) targeted attacks may involve more than just malware and (2) computing environments purposely built for analyzing malware may not adequately represent live production computing systems (e.g., many targeted attacks may span many uniquely-configured computing devices). As a result, traditional security software may fail to analyze and remediate the global impact of an attack on a computing system, especially an attack that involves human-driven behaviors from undetected benign and/or malicious software spread across many computing devices within a victim's computing system. Accordingly, the instant disclosure identifies and addresses a need for systems and methods for using event-correlation graphs to generate remediation procedures.

SUMMARY

As will be described in greater detail below, the instant disclosure describes various systems and methods for using event-correlation graphs to generate remediation procedures. In one example, a computer-implemented method for using event-correlation graphs to generate remediation procedures may include (1) detecting a suspicious event involving a first actor within a computing system, (2) constructing, in response to detecting the suspicious event involving the first actor, an event-correlation graph that includes (i) a first node that represents the first actor, (ii) a second node that represents a second actor, and (iii) an edge that interconnects the first node and the second node and represents an additional suspicious event involving the first actor and the second actor, and (3) using the event-correlation graph to generate a procedure for remediating an effect of an attack on the computing system that is reflected in the event-correlation graph. In some embodiments, the method may further include recommending the procedure to an administrator of the computing system and/or a user of the computing system. In at least one embodiment, the computing system may be a live production system.

In some embodiments, the step of using the event-correlation graph to generate the procedure for remediating the effect of the attack on the computing system may include (1) using the event-correlation graph to determine that security credentials were accessed during the attack and (2) generating a procedure for resetting the security credentials.

In some embodiments, the step of using the event-correlation graph to generate the procedure for remediating the effect of the attack on the computing system may include (1) using the event-correlation graph to determine that a keylogger was executed on a computing device within the computing system on which security credentials were accessible and (2) generating a procedure for resetting the security credentials.

In some embodiments, the step of using the event-correlation graph to generate the procedure for remediating the effect of the attack on the computing system may include (1) using the event-correlation graph to determine that a domain controller was infected during the attack and (2) generating a procedure for resetting security credentials managed by the domain controller.

In some embodiments, the step of using the event-correlation graph to generate the procedure for remediating the effect of the attack on the computing system may include (1) using the event-correlation graph to determine that an actor involved in the attack is external to the computing system and (2) generating a procedure for adding the external actor to a blacklist.

In some embodiments, the step of using the event-correlation graph to generate the procedure for remediating the effect of the attack on the computing system may include (1) using the event-correlation graph to determine that a benign application was involved in the attack and (2) generating a procedure for improving the security of the benign application.

In some embodiments, the step of using the event-correlation graph to generate the procedure for remediating the effect of the attack on the computing system may include (1) using the event-correlation graph to determine that a nonessential benign application was involved in the attack and (2) generating a procedure for reducing use of the nonessential benign application.

In some embodiments, the step of using the event-correlation graph to generate the procedure for remediating the effect of the attack on the computing system may include (1) using the event-correlation graph to determine that a hacking tool was involved in the attack and (2) generating a procedure for removing the hacking tool.

In some embodiments, the step of using the event-correlation graph to generate the procedure for remediating the effect of the attack on the computing system may include (1) using the event-correlation graph to determine that an actor involved in the attack made modifications to a file system and (2) generating a procedure for undoing the modifications to the file system.

In some embodiments, the step of using the event-correlation graph to generate the procedure for remediating the effect of the attack on the computing system may include (1) using the event-correlation graph to determine that an actor involved in the attack made modifications to a registry and (2) generating a procedure for undoing the modifications to the registry.

In some embodiments, the step of using the event-correlation graph to generate the procedure for remediating the effect of the attack on the computing system may include (1) using the event-correlation graph to determine that unencrypted communications occurred during the attack and (2) notifying an administrator of the unencrypted communications that occurred during the attack.

In some examples, the attack may include a phishing attack, and the step of using the event-correlation graph to generate the procedure for remediating the effect of the attack on the computing system may include (1) using the event-correlation graph to identify at least one user involved in the phishing attack and (2) generating a procedure for educating the user about phishing attacks and/or notifying an administrator of the user involved in the phishing attack.

In one embodiment, a system for implementing the above-described method may include (1) a detecting module, stored in memory, that detects a suspicious event involving a first actor within a computing system, (2) a constructing module, stored in memory, that constructs, in response to detecting the suspicious event involving the first actor, an event-correlation graph that includes (i) a first node that represents the first actor, (ii) a second node that represents a second actor, and (iii) an edge that interconnects the first node and the second node and represents an additional suspicious event involving the first actor and the second actor, (3) a remediating module, stored in memory, that uses the event-correlation graph to generate a procedure for remediating an effect of an attack on the computing system that is reflected in the event-correlation graph, and (4) at least one processor that executes the detecting module, the constructing module, and the remediating module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) detect a suspicious event involving a first actor within a computing system, (2) construct, in response to detecting the suspicious event involving the first actor, an event-correlation graph that includes (i) a first node that represents the first actor, (ii) a second node that represents a second actor, and (iii) an edge that interconnects the first node and the second node and represents an additional suspicious event involving the first actor and the second actor, (3) use the event-correlation graph to generate a procedure for remediating an effect of an attack on the computing system that is reflected in the event-correlation graph.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
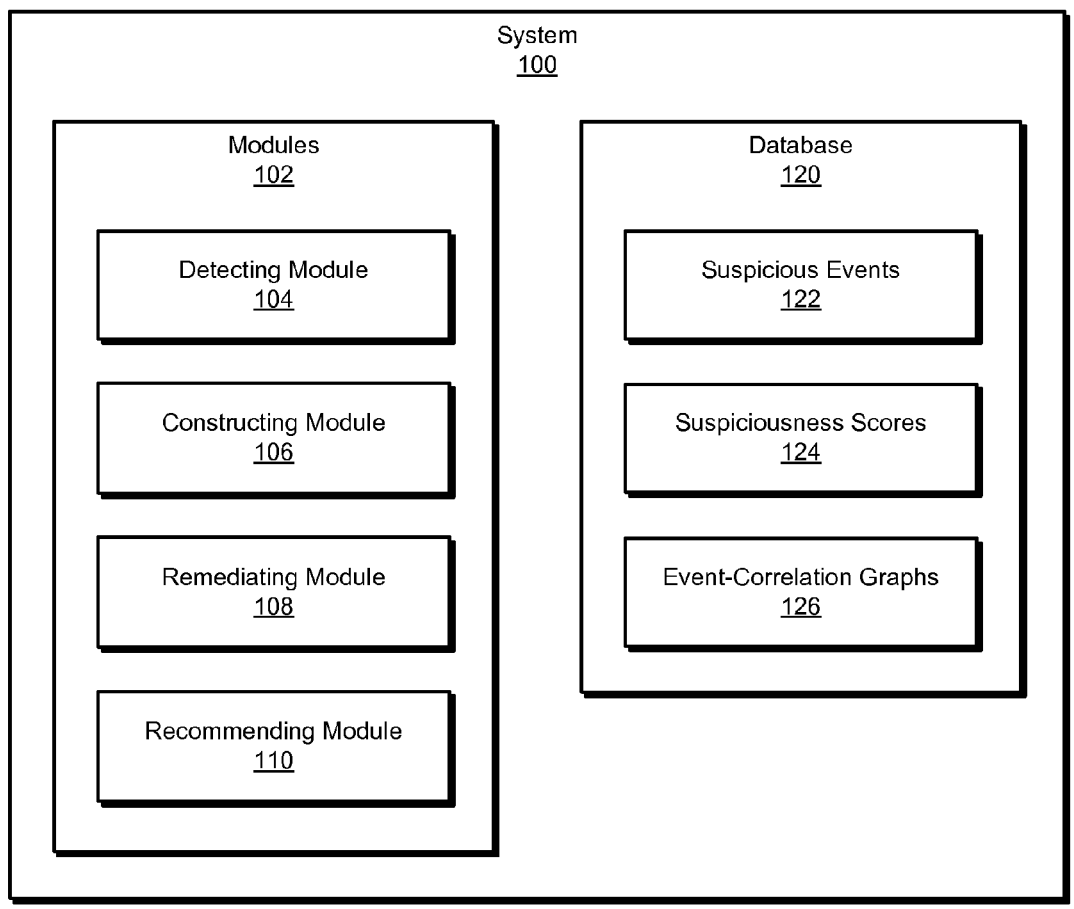
FIG. 1 is a block diagram of an exemplary system for using event-correlation graphs to generate remediation procedures.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for using event-correlation graphs to generate remediation procedures. As will be explained in greater detail below, by using suspicious events to construct event-correlation graphs based on how the actors involved in the suspicious events are related by the suspicious events, the systems and methods described herein may enable the detection and remediation of targeted attacks on computing systems. Furthermore, in some examples, by detecting attacks on computing systems using a graph-based correlation approach, these systems and methods may (1) generate forensic information that may provide a greater understanding of the actual global impact of the attacks (e.g., the impact of each malicious or benign actor involved in the attack) and (2) generate procedures for remediating the actual global impact of the attacks.

Embodiments of the instant disclosure may also provide various other advantages and features, as discussed in greater detail below.

Figure 2:
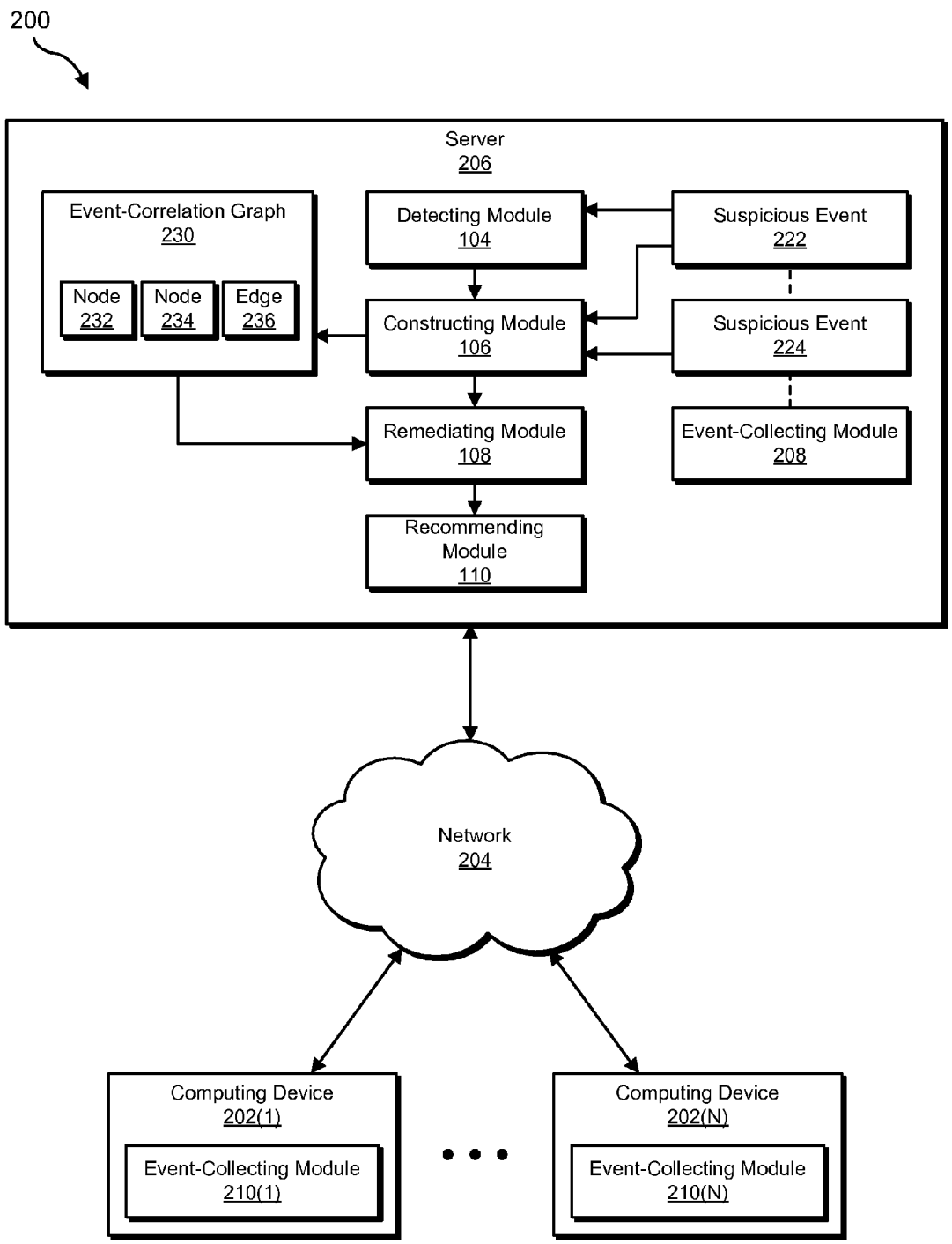
FIG. 2 is a block diagram of an additional exemplary system for using event-correlation graphs to generate remediation procedures.

The following will provide, with reference to FIGS. 1-2, detailed descriptions of exemplary systems for using event-correlation graphs to generate remediation procedures. Detailed descriptions of corresponding computer-implemented methods will also be provided in connection with FIGS. 3-10. In addition, detailed descriptions of an exemplary computing system and network architecture capable of implementing one or more of the embodiments described herein will be provided in connection with FIGS. 11 and 12, respectively.

FIG. 1 is a block diagram of an exemplary system 100 for using event-correlation graphs to generate remediation procedures. As illustrated in this figure, exemplary system 100 may include one or more modules 102 for performing one or more tasks. For example, and as will be explained in greater detail below, exemplary system 100 may include a detecting module 104 that detects a suspicious event involving a first actor within a computing system. Exemplary system 100 may also include a constructing module 106 that constructs an event-correlation graph in response to detecting the suspicious event involving the first actor.

In addition, and as will be described in greater detail below, exemplary system 100 may include a remediating module 108 that uses the event-correlation graph to generate a procedure for remediating an effect of an attack reflected in the event-correlation graph. Exemplary system 100 may also include a recommending module 110 that recommends the procedure to an administrator of the computing system and/or a user of the computing system. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing devices 202(1)-(N) and/or server 206), computing system 1110 in FIG. 11, and/or portions of exemplary network architecture 1200 in FIG. 12. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may store information about one or more suspicious events (e.g., suspicious events 122), information about suspiciousness scores associated with actors and/or suspicious events (e.g., suspiciousness scores 124), and/or information about one or more correlation graphs (e.g., event-correlation graphs 126).

Database 120 may represent portions of a single database or computing device or a plurality of databases or computing devices. For example, database 120 may represent a portion of server 206 and/or a portion of computing devices 202(1)-(N) in FIG. 2, computing system 1110 in FIG. 11, and/or portions of exemplary network architecture 1200 in FIG. 12. Alternatively, database 120 in FIG. 1 may represent one or more physically separate devices capable of being accessed by a computing device, such as server 206 in FIG. 2, computing system 1110 in FIG. 11, and/or portions of exemplary network architecture 1200 in FIG. 12.

Exemplary system 100 in FIG. 1 may be implemented in a variety of ways. For example, all or a portion of exemplary system 100 may represent portions of exemplary system 200 in FIG. 2. As shown in FIG. 2, system 200 may include computing devices 202(1)-(N) in communication with a server 206 via a network 204. Computing devices 202(1)-(N) may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing devices 202(1)-(N) and/or server 206, enable computing devices 202(1)-(N) and/or server 206 to generate remediation procedures using event-correlation graphs. For example, and as will be described in greater detail below, detecting module 104 may detect a suspicious event 222 involving a first actor within a computing system (e.g., a process executing on computing device 202(1)). Constructing module 106 may then construct, in response to detecting suspicious event 222 involving the first actor, an event-correlation graph 230 that may include at least a node 232 that represents the first actor, a node 234 that represents a second actor, and an edge 236 that interconnects node 232 and node 234 and represents an additional suspicious event 224 involving the first actor and the second actor. Finally, remediating module 108 may use event-correlation graph 230 to generate a procedure for remediating an effect of an attack reflected in event-correlation graph 230.

Computing devices 202(1)-(N) generally represent any type or form of computing device capable of reading computer-executable instructions. Examples of computing devices 202(1)-(N) include, without limitation, laptops, tablets, desktops, servers, cellular phones, Personal Digital Assistants (PDAs), multimedia players, embedded systems, combinations of one or more of the same, exemplary computing system 1110 in FIG. 11, or any other suitable computing device. As illustrated in FIG. 2, one or more of event-collecting modules 210(1)-(N) may detect, log, and/or transmit information about suspicious events (e.g., to server 206).

Server 206 generally represents any type or form of computing device that is capable of reading computer-executable instructions. Examples of server 206 include, without limitation, application servers and database servers configured to provide various database services and/or run certain software applications. As illustrated in FIG. 2, server 206 may include an event-collecting module 208 that collects event information from computing devices 202(1)-(N) and stores this information to database 120. In at least one example, event-collecting module 208 may represent a portion of a security information and event management system (SIEM), a security information management system (SIM), and/or security event manager (SEM).

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 1200 in FIG. 12, or the like. Network 204 may facilitate communication or data transfer using wireless or wired connections. In one embodiment, network 204 may facilitate communication between computing devices 202(1)-(N) and server 206.

Figure 3:
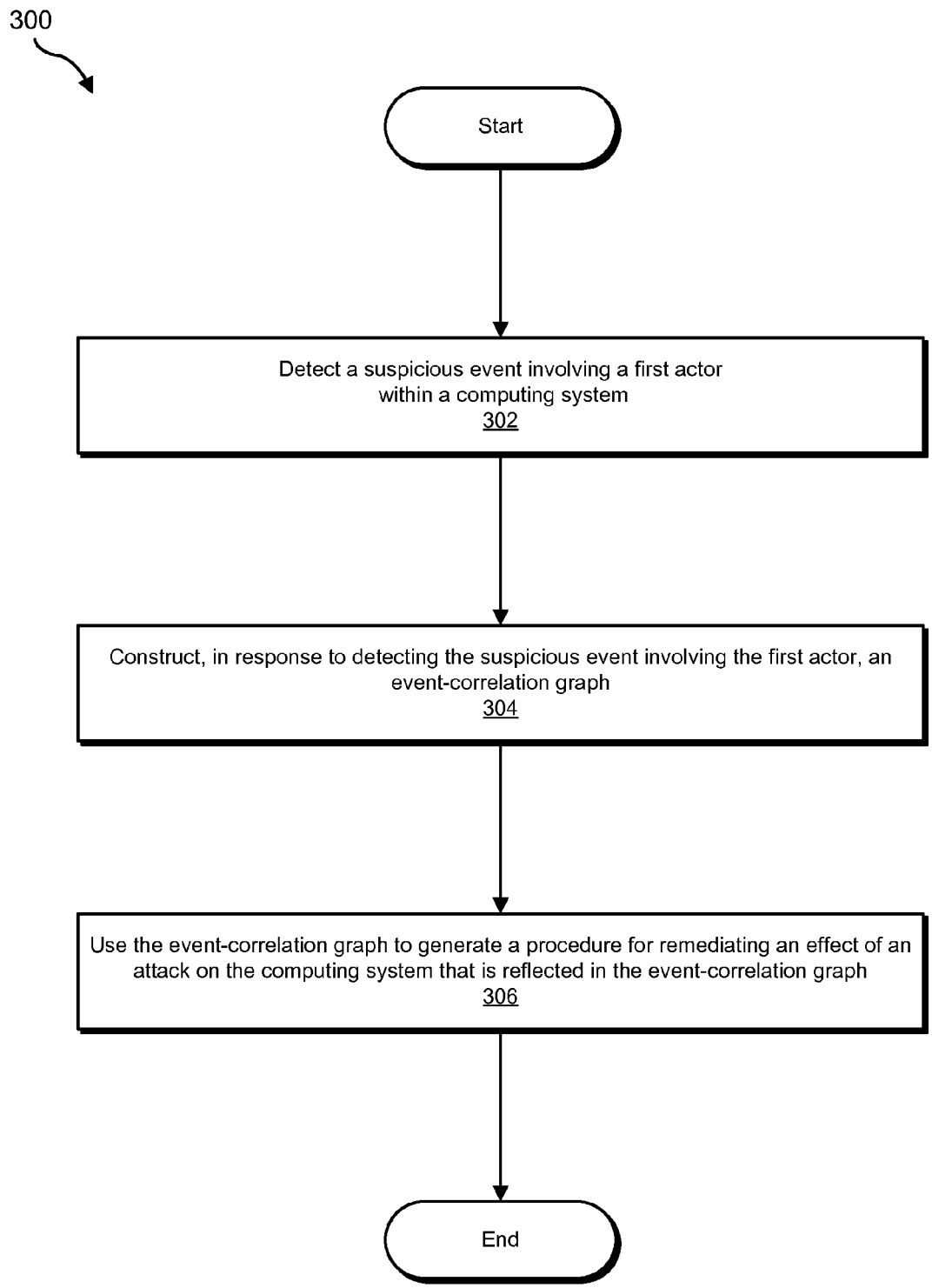
FIG. 3 is a flow diagram of an exemplary method for using event-correlation graphs to generate remediation procedures.

FIG. 3 is a flow diagram of an exemplary computer-implemented method 300 for using event-correlation graphs to generate remediation procedures. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 1110 in FIG. 11, and/or portions of exemplary network architecture 1200 in FIG. 12.

As illustrated in FIG. 3, at step 302 one or more of the systems described herein may detect a suspicious event involving a first actor within a computing system. For example, detecting module 104 may, as part of server 206 in FIG. 2, detect suspicious event 222 involving a first actor within a computing system (e.g., a process executing on computing device 202(1)).

The phrase "suspicious event," as used herein, generally refers to any occurrence of one or more actions or behaviors within a computing system that may be indicative of an attack on the computing system. In at least one example, the phrase "suspicious event" may refer to a suspicious high-level event that represents the detection of one or more low-level events. In some examples, the phrase "suspicious event" may represent the occurrence of an action within a computing system that may not reliably indicate an attack on a computing system unless it is correlated with a certain number of additional suspicious events. Examples of suspicious events may include, without limitation, process injections, file creations, file downloads, process creations, process enumerations, registry modifications, file-system modifications, event-log modifications, and/or security-service modifications.

Additional examples of suspicious events may include, without limitation, any actions managed and/or monitored by firewalls, routers, switches, virtual private networks, antivirus systems, intrusion detection and intrusion prevention systems, vulnerability scanners, web servers, web filters, proxies, databases, email and/or groupware systems, authentication servers, and/or system loggers. In some examples, a suspicious event may refer to any suspicious event detected and/or managed by a Security Information and Event Management system (SIEM), a Security Information Management system (SIM), and/or a Security Event Manager (SEM).

In some examples, the suspicious event may include a process injection. As used herein, the phrase "process injection" may refer to any method for one process to introduce executable instructions into another process to execute. Examples of process injection may include injecting a dynamic-link library into a running process and hooking a function call within another process.

As used herein, the term "actor" may refer to any computing entity that may perform an action and/or any computing entity that may have an action performed on it. Examples of actors may include, without limitation, users, user accounts, executables, processes, applications, computing devices, files, Internet Protocol (IP) addresses, ports, information resources (e.g., a website), uniform resource locators (URLs), and/or any network-addressable entities. As used herein, the phrase "computing system" may generally refer to any collection of one or more actors. In some examples, the phrase "computing system" may refer to a collection of computing devices coupled to a network. In at least one example, the phrase "computing system" may refer to a live production computing environment, such as an enterprise's computing network.

Detecting module 104 may detect a suspicious event that involves an actor in any of a variety of ways. For example, detecting module 104 may detect a suspicious event that involves an actor by monitoring the actor and by detecting when the actor performs a suspicious action. For example, detecting module 104 may represent an agent of a SIEM or SIM system running on a computing device that detects and/or collects information about suspicious events that occur on the computing device and may detect the suspicious event as part of the agent of the SIEM or SIM system.

In another example, detecting module 104 may detect a suspicious event that involves an actor by receiving information about the suspicious event. Using FIG. 2 as an example, detecting module 104 may receive information about a suspicious event that involved an actor from one or more of event-collecting modules 210(1)-(N) that detected and logged the suspicious event. Additionally or alternatively, detecting module 104 may detect a suspicious event by identifying a previously detected suspicious event. For example, detecting module 104 may represent a server-side or cloud-based system that analyzes information about previously detected suspicious events.

In some examples, detecting module 104 may detect a suspicious event that involves an actor by detecting when the actor performs the suspicious event. For example, detecting module 104 may, as a part of the computing system, detect a suspicious event that involves an actor on the computing system by detecting when the actor performs the suspicious event. In addition to detecting suspicious events, detecting module 104 may also identify information about the event, such as, for example, information that identifies the actor or actors involved with the suspicious event and/or information that identifies attributes of the suspicious event and/or actors.

Figure 4:
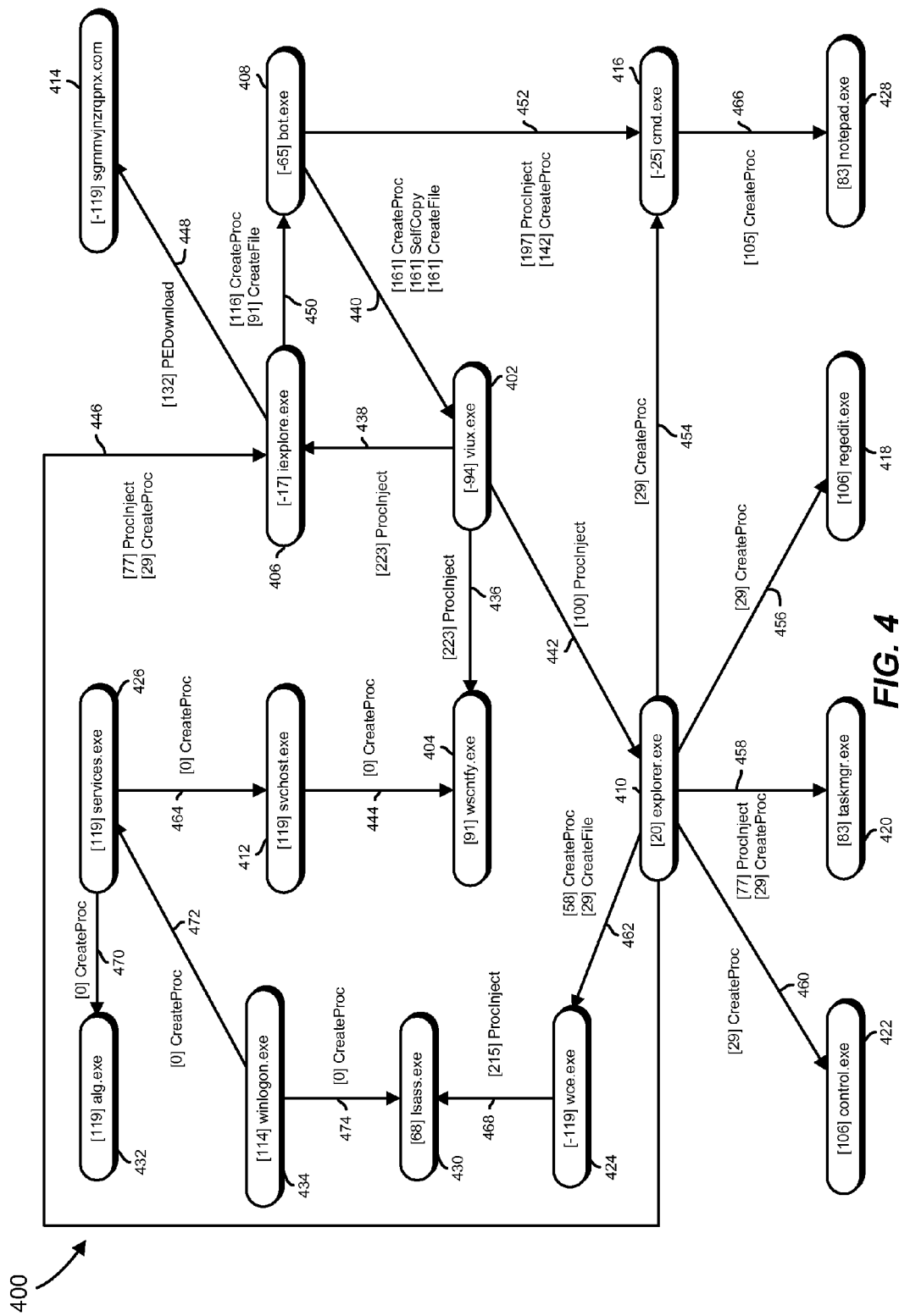
FIG. 4 is a block diagram of an exemplary event-correlation graph.

To provide an example of detecting module 104 detecting a suspicious event, FIG. 4 illustrates an exemplary event-correlation graph 400. As shown in FIG. 4, event-correlation graph 400 may include a node 402 that represents a first actor (e.g., the executable "viux.exe"), a node 404 that represents another actor (e.g., the executable "wscntfy.exe"), and an edge 436 that represents an event (e.g., a process injection by "viux.exe" into "wscntfy.exe"). In this example at step 302, detecting module 104 may detect the process injection represented by node 436.

Returning to FIG. 3, at step 304 one or more of the systems described herein may construct, in response to detecting the suspicious event involving the first actor, an event-correlation graph that may include (i) a first node that represents the first actor, (ii) a second node that represents a second actor, and (iii) an edge that interconnects the first node and the second node and represents an additional suspicious event involving the first actor and the second actor. For example, constructing module 106 may, as part of server 206 in FIG. 2, construct, in response to the detection of suspicious event 222 involving the first actor, event-correlation graph 230 that includes node 232 that represents the first actor, node 234 that represents a second actor, and edge 236 that interconnects node 232 and node 234 and represents suspicious event 224 involving the first actor and the second actor.

As used herein, the term "event-correlation graph" generally refers to any logical, topological, and/or graphical representation of one or more correlated suspicious events that is based on how the actors involved in the suspicious events are related by the suspicious events. Event-correlation graphs may include forensic information about attacks on computing systems. For example, event-correlation graphs may include the actors involved in the attacks, behaviors of the actors involved in the attacks, and relationships between the actors involved in the attacks. In some examples, an event-correlation graph may capture malicious activities and/or behaviors involved in a targeted attack campaign. As will be described in greater detail below, event-correlation graphs may be built from information about one or more suspicious events and may include representations (e.g., nodes) of the actors involved in the suspicious events that are connected by representations (e.g., edges, such as directed edges) of how the actors are related by the suspicious events.

Using FIG. 4 as an example, event-correlation graph 400 may include nodes 402-434 interconnected by directed edges 436-474. In this example, nodes 402-434 may represent the actors involved with the correlated suspicious events represented by directed edges 436-474. As will be explained in greater detail below, one or more of the systems described herein may create event-correlation graph 400 in response to detecting the suspicious event represented by edge 436 involving "viux.exe" and "wscntfy.exe" represented by nodes 402 and 404, respectively.

The additional suspicious event may include any of a variety of events. In some examples, detecting module 104 and/or constructing module 106 may identify the additional suspicious event as independently suspicious. Additionally or alternatively, the additional suspicious event may be suspicious in context of the suspicious event.

Constructing module 106 may construct an event-correlation graph in any suitable manner. For example, constructing module 106 may construct an event-correlation graph in response to detecting a suspicious event by identifying additional suspicious events that may be correlated with the suspicious event based on how the actors involved in the suspicious event and the additional suspicious events are related by the suspicious event and the additional suspicious events.

In one example, constructing module 106 may construct an event-correlation graph in response to detecting a suspicious event by adding one or more nodes and edges to the event-correlation graph based on a single suspicious event, after which constructing module 106 may iteratively add nodes and edges to the event-correlation graph starting with the suspicious event and any actors involved in the suspicious event. For example, in response to detecting a suspicious event involving a first actor, constructing module 106 may construct an event-correlation graph for the suspicious event by first generating an event-correlation graph that includes at least a node that represents the first actor. In the event that the suspicious event involves a second actor, constructing module 106 may add an additional node to the event-correlation graph that represents the second actor and an edge that connects the nodes representing the first and second actors.

In some examples, constructing module 106 may construct the event-correlation graph using only suspicious events. For example upon adding at least one node to the event-correlation graph, constructing module 106 may identify, for each actor represented by a node within the event-correlation graph, a set of suspicious events that involve the actor and at least one additional actor. Constructing module 106 may further add, for each suspicious event within the set of suspicious events, an additional node to the event-correlation graph that represents the additional actor and an additional edge to the event-correlation graph that interconnects the node and the additional node and represents the event involving the actor and the additional actor.

In addition or as an alternative to identifying suspicious events that involve two or more actors, constructing module 106 may, for each actor represented by a node within the event-correlation graph, identify a set of suspicious events that involve the actor and no other actor. In this example, constructing module 106 may further associate each suspicious event within the set of suspicious events with the node that represents the actor.

Figure 5:
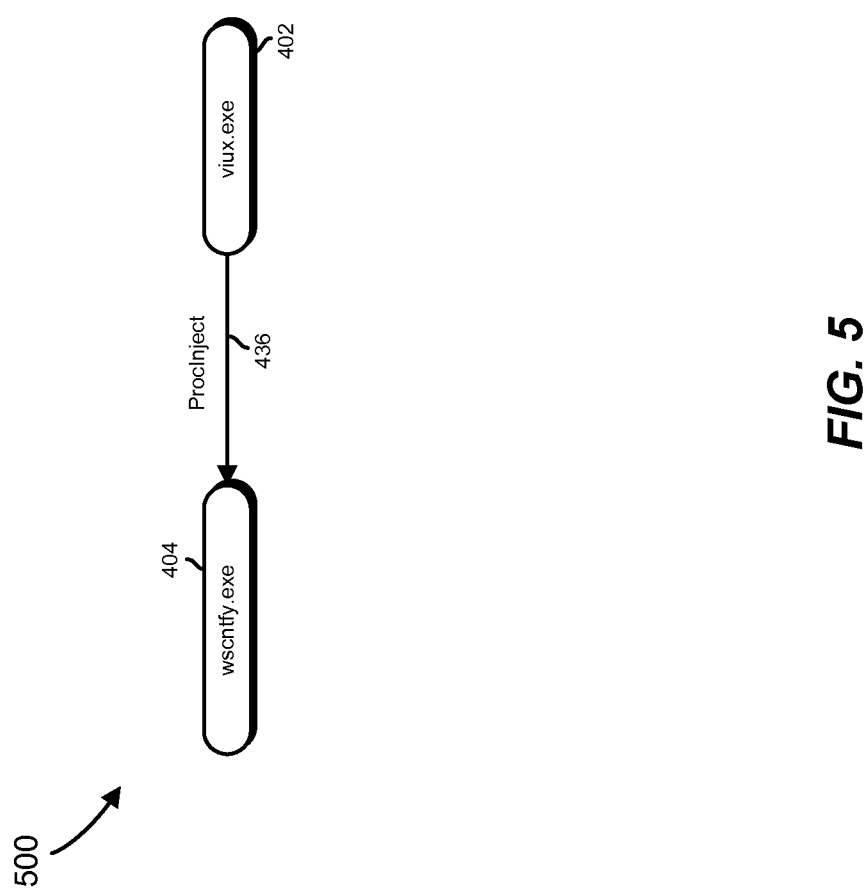
FIG. 5 is a block diagram of an exemplary event-correlation graph.

FIGS. 5-9 illustrate how constructing module 106 may iteratively construct event-correlation graph 400 in FIG. 4. FIG. 5 is a block diagram of an exemplary event-correlation graph 500. As shown in FIG. 5, event-correlation-graph 500 may represent a first iteration in the construction of event-correlation graph 400 in FIG. 4. In this example, detecting module 104 may have detected a suspicious process-injection event involving "viux.exe" and "wscntfy.exe." In response to this detection, constructing module 106 may have generated event-correlation-graph 500 that includes node 402 that represents "viux.exe" and node 404 that represents "wscntfy.exe" connected by an edge 436 that represents the suspicious process-injection event.

Figure 6:
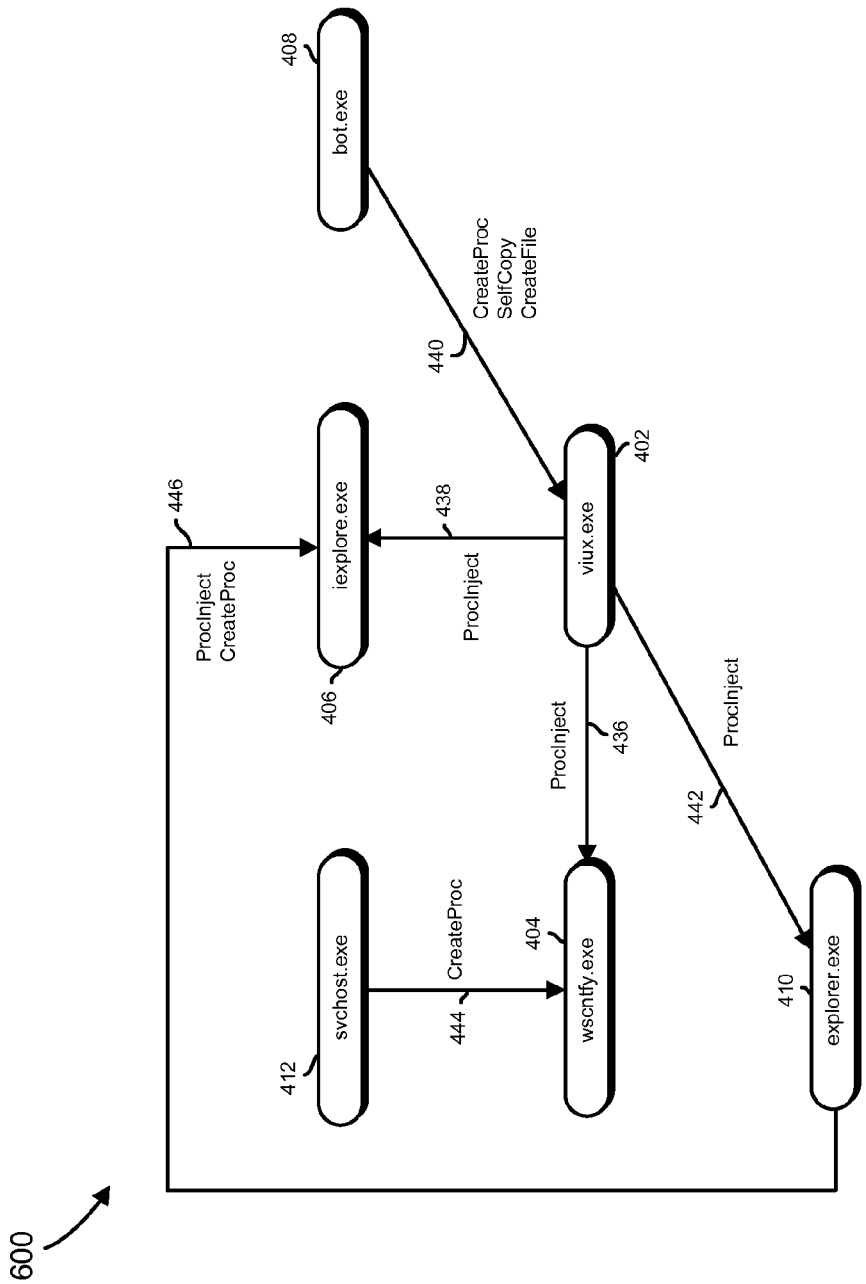
FIG. 6 is a block diagram of an exemplary event-correlation graph.
Figure 7:
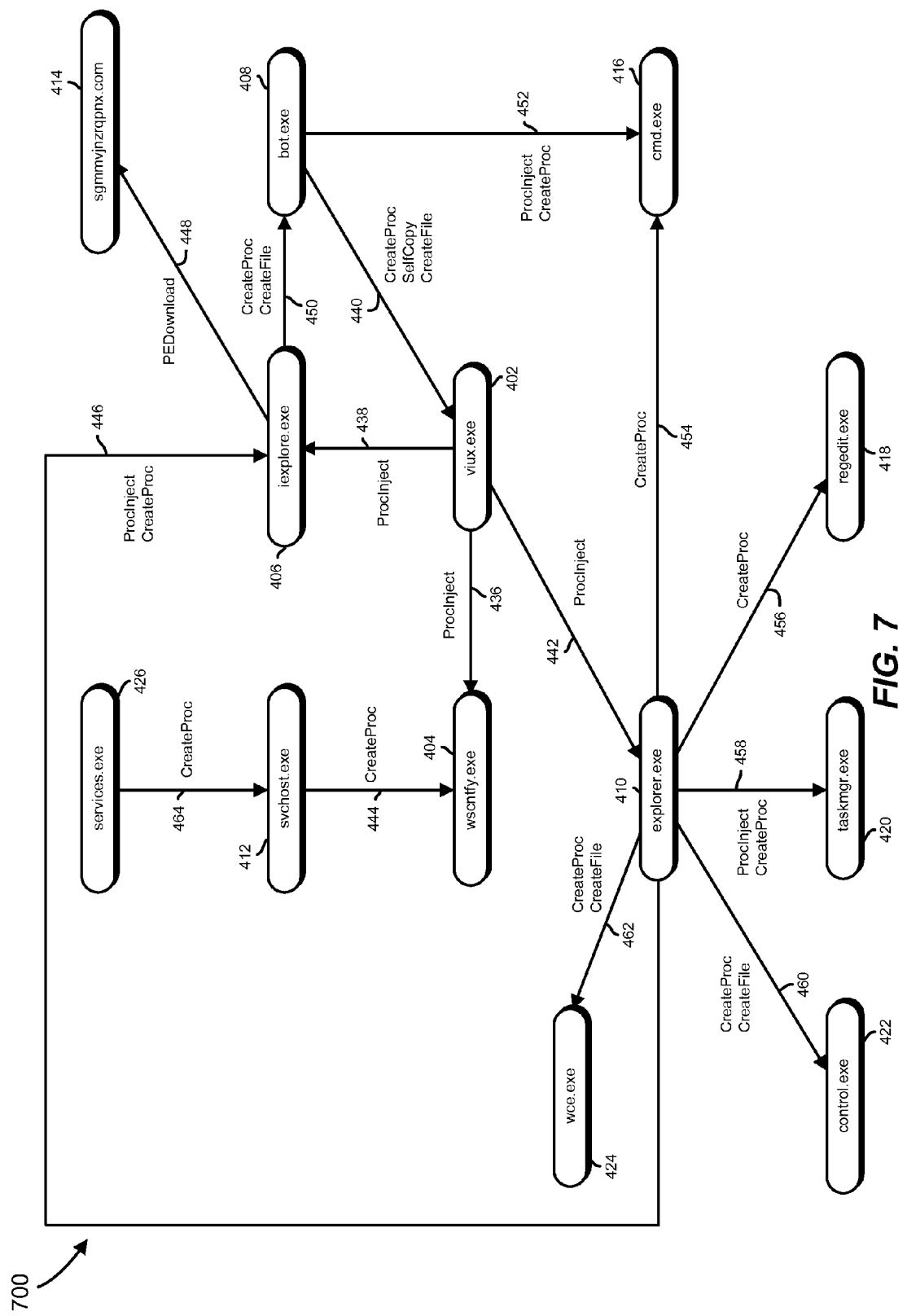
FIG. 7 is a block diagram of an exemplary event-correlation graph.
Figure 8:
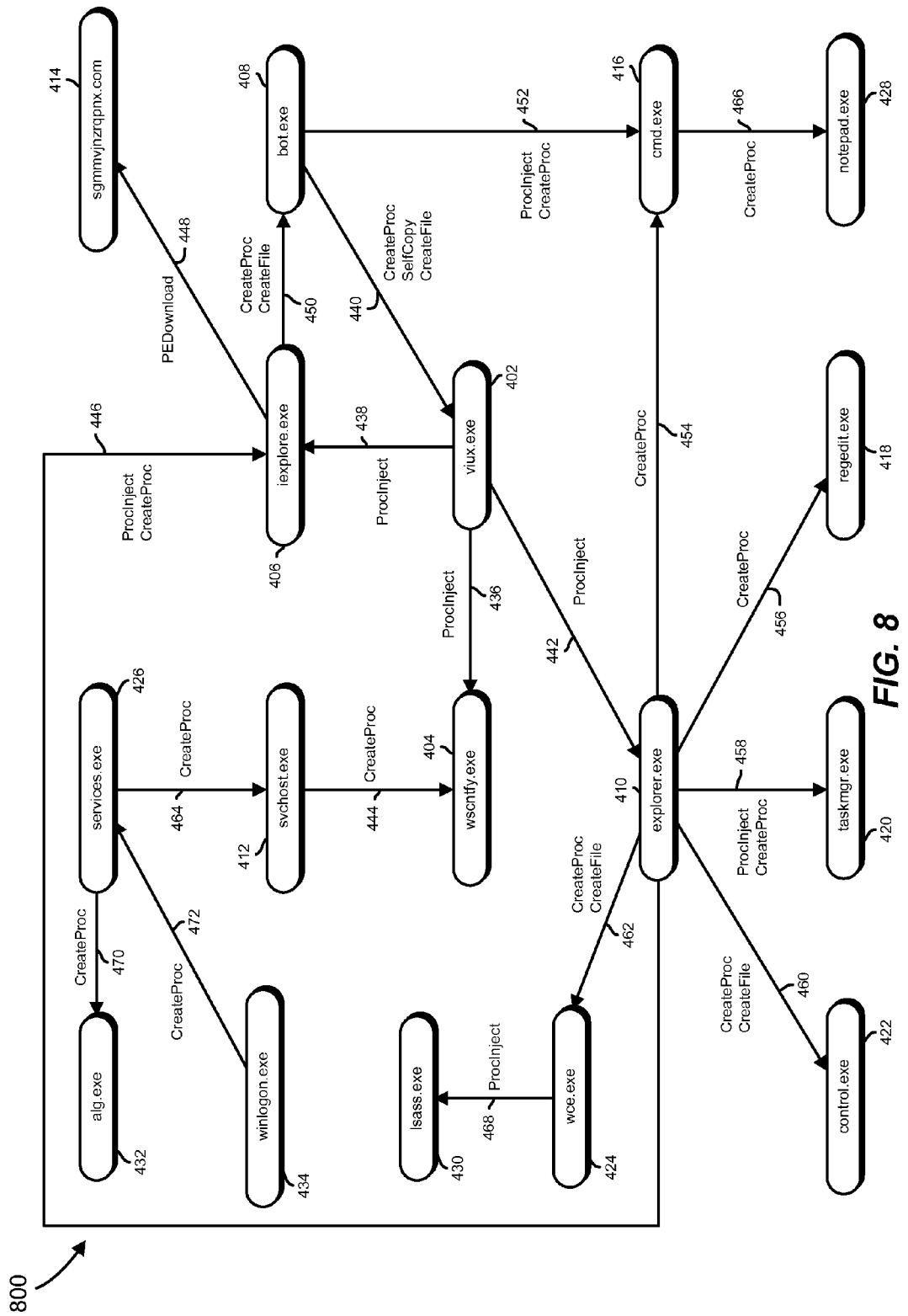
FIG. 8 is a block diagram of an exemplary event-correlation graph.
Figure 9:
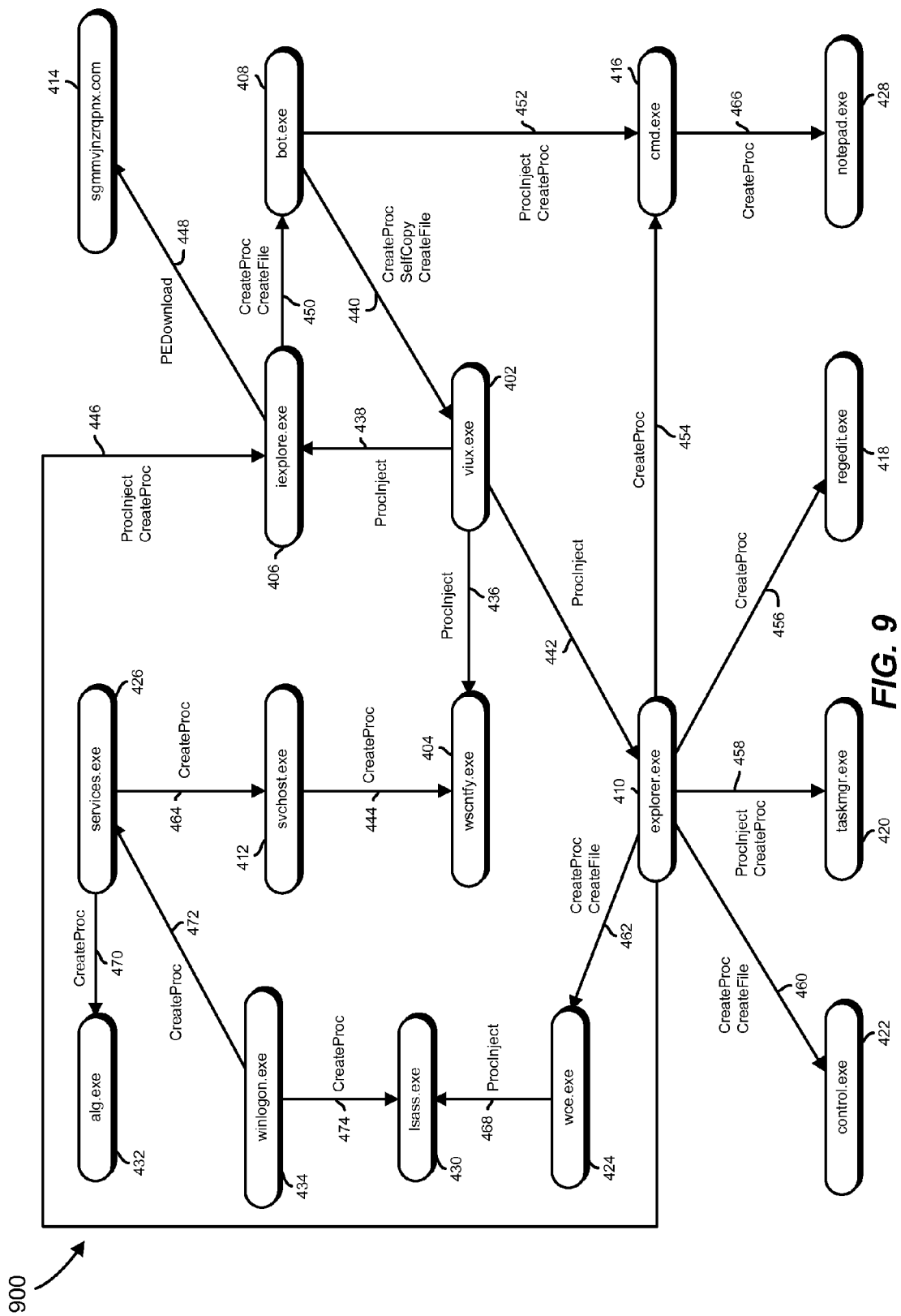
FIG. 9 is a block diagram of an exemplary event-correlation graph.
Figure 10:
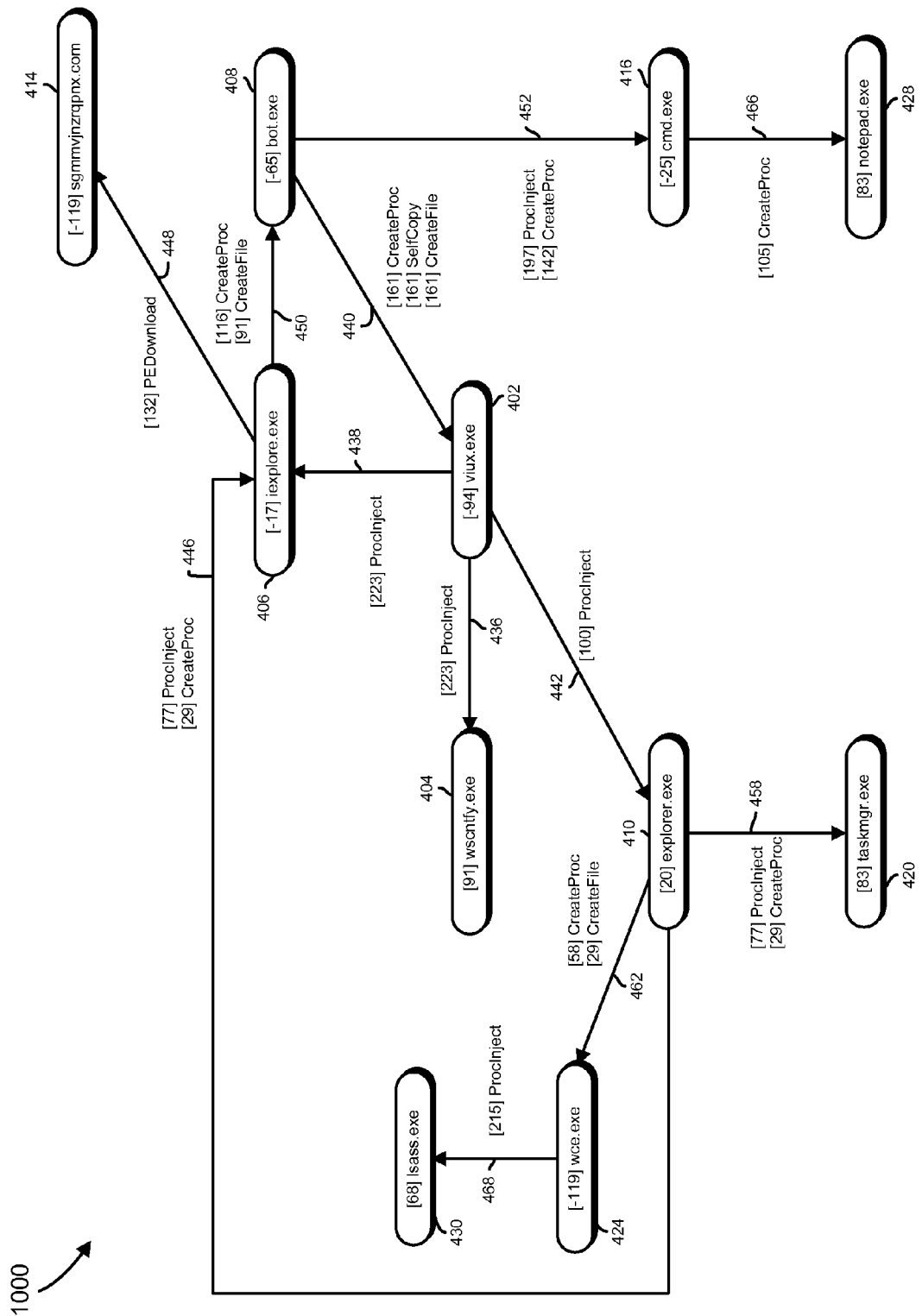
FIG. 10 is a block diagram of an exemplary event-correlation graph.

Upon constructing event-correlation graph 500 in FIG. 5, constructing module 106 may construct event-correlation graph 600 in FIG. 6 from event-correlation graph 500 by (1) identifying additional suspicious events that involve the actors represented in event-correlation graph 500 (e.g., "viux.exe" and "wscntfy.exe") and (2) adding, for each identified suspicious event, a representation of the suspicious event to event-correlation graph 600. For example, constructing module 106 may identify, for "viux.exe" represented by node 402 in event-correlation graph 500, a set of suspicious events that involve "viux.exe" and one of executables "iexplorer.exe," "bot.exe," and "explorer.exe." Constructing module 106 may add nodes to event-correlation graph 500 that represent these additional actors (e.g., nodes 406, 408, and 410) and edges that represent the set of suspicious events (e.g., edges 438, 440, and 442) and that interconnect node 402 and nodes 406, 408, and 410. Constructing module 106 may also identify, for "wscntfy.exe" represented by node 404 in event-correlation graph 500, a suspicious event that involves "wscntfy.exe" and the executable "svchost.exe." In response, constructing module 106 may add a node to event-correlation graph 500 that represents "svchost.exe" (e.g., node 412) and an edge that represents the suspicious event involving "wscntfy.exe" and "svchost.exe" (e.g., edge 444) and that interconnects node 404 and node 412.

Upon constructing event-correlation graph 600 in FIG. 6, constructing module 106 may construct exemplary event-correlation graph 700 from event-correlation graph 600 by (1) identifying additional suspicious events that involve the new actors represented in event-correlation graph 600 (e.g., "iexplore.exe," "bot.exe," "explorer.exe," and "svchost.exe") and (2) adding, for each identified suspicious event, a representation of the suspicious event to event-correlation graph 600 in FIG. 6.

Constructing module 106 may continue to iteratively construct event-correlation graph 400 from event-correlation graph 700 until constructing module 106 is unable to identify additional suspicious events. For example, constructing module 106 may construct event-correlation graph 800 in FIG. 8 from event-correlation graph 700 in FIG. 7 and event-correlation graph 900 in FIG. 9 from event-correlation graph 800. Constructing module 106 may determine that event-correlation graph 900 represents a completed event-correlation graph after identifying no additional suspicious events involving the actors in event-correlation graph 900.

As will be explained in greater detail below, the systems and methods described herein may use suspiciousness scores associated with the actors and/or suspicious events represented in an event-correlation graph to detect attacks involving the actors and/or suspicious events and/or to generate procedures for remediating effects of the actors involved in the attacks. For example, constructing module 106 may use suspiciousness scores to determine that one or more events represented in an event-correlation graph potentially represent an attack on a computing system and may, in response generate procedures for remediating the effects of the attack on the computing system. For at least this reason, constructing module 106 may determine the suspiciousness scores of the actors or suspicious events represented in an event-correlation graph as part of constructing the event-correlation graph.

Using FIG. 4 as an example, constructing module 106 may determine the suspiciousness scores associated with the actors and suspicious events represented in event-correlation graph 400 (e.g., the bracketed number next to each actor and suspicious event in event-correlation graph 400) as part of constructing event-correlation graph 400. In at least one example, constructing module 106 may determine a suspiciousness score of an actor and/or a suspicious event in the event-correlation graph based at least in part on the suspiciousness scores associated with other actors and/or suspicious events in the event-correlation graph such that the suspiciousness score of the actor and/or the suspicious event is influenced by the suspicious events represented in the event-correlation graph.

As used herein, the term "suspiciousness score" may generally refer to any metric or information that indicates the maliciousness, suspiciousness, trustworthiness, prevalence, prominence, community opinion, and/or reputation of an actor or event. In some examples, the term "suspiciousness score" may refer to a metric or information that indicates whether an actor or event represents a part of an attack and/or whether the actor or event represents a potential security risk. In the example provided in FIG. 4, the suspiciousness scores associated with actors may be on a scale from −120 to +120, where a score near −120 may indicate a high likelihood of being malicious and a score near +120 may indicate a low likelihood of being malicious. Similarly, in the example provided in FIG. 4, the suspiciousness scores associated with events may be on a scale from 0 to 250, where a score near 250 may indicate a high likelihood of being malicious and a score near 0 may indicate a low likelihood of being malicious.

Constructing module 106 may calculate an attack score for an event-correlation graph in any suitable manner. For example, constructing module 106 may calculate an attack score for an event-correlation graph by (1) identifying all or a portion of the actors and/or suspicious events represented within the event-correlation graph, (2) identifying a suspiciousness score associated with each of the identified actors and/or suspicious events, and (3) using the suspiciousness scores to calculate an attack score for the event-correlation graph. In one example, constructing module 106 may calculate an attack score for an event-correlation graph by simply adding together the suspiciousness scores of each actor and/or suspicious event represented within the event-correlation graph. In some examples, constructing module 106 may normalize the suspiciousness scores of each actor and/or suspicious event prior to calculating the attack score. Using FIG. 4 as an example, constructing module 106 may calculate an attack score for event-correlation graph 400 using the suspiciousness score (e.g., the bracketed number next to each actor and/or suspicious event in event-correlation graph 400) of each actor and/or suspicious event represented in event-correlation graph 400.

In some instances, it may be possible that benign actors, benign events, and/or actors and/or events that are not part of an attack may become part of an event-correlation graph. Constructing module 106 may address this issue by pruning actors and/or events from the event-correlation graph. In one example, constructing module 106 may prune actors and/or events from an event correlation graph based on suspiciousness scores associated with the actors and/or events. For example, constructing module 106 may remove an actor from an event-correlation graph if the suspiciousness score associated with the actor indicates that the actor is not malicious and/or was not involved in any malicious behaviors. Using FIGS. 4 and 10 as an example, constructing module 106 may remove, from event-correlation graph 400 in FIG. 4, the actors represented by nodes 412, 418, 422, 426, 432, and 434 and the suspicious events represented by directed edges 444, 454, 456, 460, 464, 470, 472, and 474. In this example, each actor represented in event-correlation graph 1000 may have been involved in an attack represented by event-correlation graph 1000.

Upon calculating an attack score for an event-correlation graph, constructing module 106 may determine that some or all of the actors and/or suspicious events were involved in an attack on the computing system if the attack score is greater than the predetermined threshold. Constructing module 106 may determine that an attack score is greater than a predetermined threshold in any suitable manner. In one example, constructing module 106 may determine that an attack score is greater than a predetermined threshold that was provided by an administrator or a user of a computing system. In another example, constructing module 106 may determine that the attack score is greater than a predetermined threshold that is based on the attack scores of other event-correlation graphs. For example, constructing module 106 may determine that the attack score is greater than an average attack score and/or determine that the attack score is greater than the attack scores of a predetermined percentage of other event-correlation graphs. By using a threshold based on other event-correlation graphs, constructing module 106 may identify only event-correlation graphs that are most likely to reflect an attack on a computing system.

Returning to FIG. 3, at step 306 one or more of the systems described herein may use the event-correlation graph constructed as part of step 304 to generate a procedure for remediating an effect of an attack on the computing system that is reflected in the event-correlation graph. For example, remediating module 108 may, as part of server 206 in FIG. 2, use event-correlation graph 230 to generate a procedure for remediating an effect of an attack reflected in event-correlation graph 230. Upon completion of step 306, exemplary method 300 in FIG. 3 may terminate.

Remediating module 108 may use event-correlation graphs to generate procedures for remediating attacks reflected in the event-correlation graphs in any suitable manner. In general, remediating module 108 may use the forensic information contained in event-correlation graphs to generate procedures for remediating the actual global impact of the attacks reflected in the event-correlation graphs. In one example, remediating module 108 may use event-correlation graphs to generate any of a variety of steps for repairing, reducing, warning about, gathering information about, and/or otherwise addressing an impact of an attack on a computing system, an impact of an actor involved in an attack on a computing system, and/or an impact of a suspicious event involved in an attack on a computing system. Additionally or alternatively, remediating module 108 may use event-correlation graphs to generate any of a variety of steps for preventing, reducing, warning about, gathering information about, and/or otherwise addressing potential attacks on a computing system. In at least one example, remediating module 108 may use an event-correlation graph that reflects an attack on a computing system to generate any of a variety of steps for preventing, reducing, warning about, gathering information about, and/or otherwise addressing potential attacks on other computing systems.

In some examples, upon generating a procedure for remediating an effect of an attack on a computing system, remediating module 108 may automatically apply the procedure to remediate the effect of the attack. Additionally or alternatively, recommending module 110 may recommend the procedure to an administrator of the computing system and/or a user of the computing system. In at least one example, recommending module 110 may automatically apply the procedure to remediate the effect of the attack in response to a request from an administrator and/or a user.

In some examples, remediating module 108 may use an event-correlation graph to determine that security credentials may have been accessed during an attack reflected in the event-correlation graph. For example, in some instances, an event-correlation graph may indicate that security credentials were accessed by an actor involved in an attack, that a domain controller (e.g., a Lightweight Directory Access Protocol (LDAP) based authentication service) was infected during an attack, and/or that a keylogger was executed on a computing device on which security credentials were accessible. In such instances, remediating module 108 may use the event-correlation graph to determine what security credentials may have been affected by the attack and may generate a procedure for resetting the affected security credentials.

For example, remediating module 108 may use an event-correlation graph that indicates that a database containing security credentials (e.g., a Security Accounts Manager (SAM) database) may have been accessed during an attack reflected in the event-correlation graph to generate a procedure for resetting the security credentials contained in the database. In one example, remediating module 108 may determine that a database containing security credentials may have been accessed during an attack by using an event-correlation graph to determine that an authentication service (e.g., a Local Security Authority Subsystem Service (LSASS)) was compromised during the attack. Using FIG. 4 as an example, remediating module 108 may use event-correlation graph 400 to determine that "lsass.exe" may have been involved in an attack reflected in event-correlation graph 400 and may generate a procedure for resetting the security credentials managed by "lsass.exe."

In some examples, remediating module 108 may use an event-correlation graph to determine that a keylogger was executed on a computing device by using the event-correlation graph to identify an application represented in the event-correlation graph whose behaviors indicate that the application is a keylogger.

In some examples, remediating module 108 may use an event-correlation graph to determine that an external actor (e.g., an actor that is external to an attacked computing system) is involved in an attack. For example in some instances, an event-correlation graph may include an external URL, an external website, an external command-and-control (C&C) server, an external IP address and/or port number, and/or an external email address that was involved in an attack reflected in the event-correlation graph. In such instances, remediating module 108 may use an event-correlation graph to generate a procedure for adding external actors represented in the event-correlation graph to a blacklist (e.g., a blacklist used by an Intrusion Prevention System (IPS) or a gateway-level firewall). Using FIG. 4 as an example, remediating module 108 may use event-correlation graph 400 to determine that the URL "sgmmvjnzrqpnx.com" represented by node 414 was involved in an attack reflected in event-correlation graph 400 and may add "sgmmvjnzrqpnx.com" to a blacklist such that future attempts to access "sgmmvjnzrqpnx.com" are blocked. In at least one example, remediating module 108 may use an event-correlation graph to determine that a website was used as part of a watering-hole attack.

In some examples, remediating module 108 may use an event-correlation graph to determine that a benign application was involved in an attack. In some instances, an event-correlation graph may indicate that an application that is known to be benign was compromised and used to execute an attack reflected in the event-correlation graph. For example, an event-correlation graph may indicate that a benign application was involved in a suspicious event involving process injection and/or heap spraying and/or that a benign application was used to download a suspicious low-reputation file. In such instances, remediating module 108 may use event-correlation graphs to identify benign applications involved in the attacks reflected in the event-correlation graphs and may generate a procedure for improving the security of the benign applications. For example, remediating module 108 may generate a procedure for patching, upgrading, and/or updating the benign applications. Additionally or alternatively, remediating module 108 may generate a procedure for enabling application-level firewalls and/or memory protection features for the benign applications (such as, e.g., Address Space Layout Randomization (ASLR) and/or Data Execution Prevention (DEP) features).

In the event that remediating module 108 determines that benign applications are nonessential (e.g., via usage data and/or user input), remediating module 108 may generate a procedure for reducing use of the benign applications. For example, remediating module 108 may generate a procedure for uninstalling benign applications on the computing devices on which the benign applications are nonessential.

In some examples, remediating module 108 may use an event-correlation graph to determine that a hacking tool (e.g., a remote-execution tool, a remote-access tool, a password-recover tool, etc.) was involved in an attack. For example, in some instances, an event-correlation graph may include an application whose behaviors indicate that the application is a hacking tool. In these instances, remediating module 108 may use the event-correlation graph to generate a procedure for removing (e.g., uninstalling, deleting, or quarantining) the hacking tool.

In some examples, remediating module 108 may use an event-correlation graph to identify malware involved in an attack. For example, in some instances, the suspiciousness score associated with an application represented in an event-correlation graph may indicate that the application is or is likely to be malicious. In these instances, remediating module 108 may use event-correlation graphs to identify malicious applications and may, in response, generate a procedure for removing the malicious applications and/or a procedure for revoking the digital certificates that were used to sign the malicious applications.

In some examples, remediating module 108 may use an event-correlation graph to determine that an actor involved in the attack made modifications to a file system or registry. For example in some instances, an event-correlation graph may indicate that a malicious or benign application running on a computing device made one or more changes to a file system or registry of the computing device and/or that a malicious or benign application running on a computing device made one or more changes to a file system or registry of a remote computing device. In such instances, remediating module 108 may use an event-correlation graph to identify file-system and registry modification that occurred as part of an attack reflected in the event-correlation graph and may generate a procedure for undoing the file-system and registry modifications. In some examples, remediating module 108 may generate a separate procedure for undoing file-system and registry modifications for each computing device impacted by an attack. In at least one example, remediating module 108 may generate a procedure for re-imaging a computing device if a file system or registry of the computing device was modified more than a predetermine number of times.

In some examples, remediating module 108 may use an event-correlation graph to determine that unencrypted communications occurred during an attack reflected in the event-correlation graph. For example, an event-correlation graph may indicate that unencrypted communications were transmitted and/or received from critical servers that contain sensitive information (e.g., revision control systems, domain controllers, file servers, etc.). In such instances, remediating module 108 may use an event-correlation graph to generate a procedure for notifying an administrator of specific unencrypted communications that occurred during an attack represented in the event-correlation graph.

In some examples, remediating module 108 may use an event-correlation graph to identify users that may have been involved in a phishing attack (e.g., an attack that involves sending emails to a targeted entity that contain an attachment that has been carefully crafted to take advantage of an as-yet-undiscovered vulnerability of a particular application (commonly known as a "zero-day" exploit)). For example, in some instances, an event-correlation graph may indicate that a particular computing device was infected as part of the infiltration stage of an attack reflected in the event-correlation graph. In these instances, remediating module 108 may use the event-correlation graph to identify a user of a computing device that may have been involved in an infiltration stage of an attack and may generate a procedure for educating the user about phishing attacks and/or notifying an administrator of the user involved in the phishing attack.

As explained above, by using suspicious events to construct event-correlation graphs based on how the actors involved in the suspicious events are related by the suspicious events, the systems and methods described herein may enable the detection and remediation of targeted attacks on computing systems. Furthermore, in some examples, by detecting attacks on computing systems using a graph-based correlation approach, these systems and methods may (1) generate forensic information that may provide a greater understanding of the actual global impact of the attacks (e.g., the impact of each malicious or benign actor involved in the attack) and (2) generate procedures for remediating the actual global impact of the attacks. For example, the systems described herein may (1) construct an event-correlation graph based on one or more detected suspicious events involved in an attack on a computing system and (2) use the forensic information contained in the event-correlation graph to generate procedures for remediating the global impact of the attack on the computing system.

Figure 11:
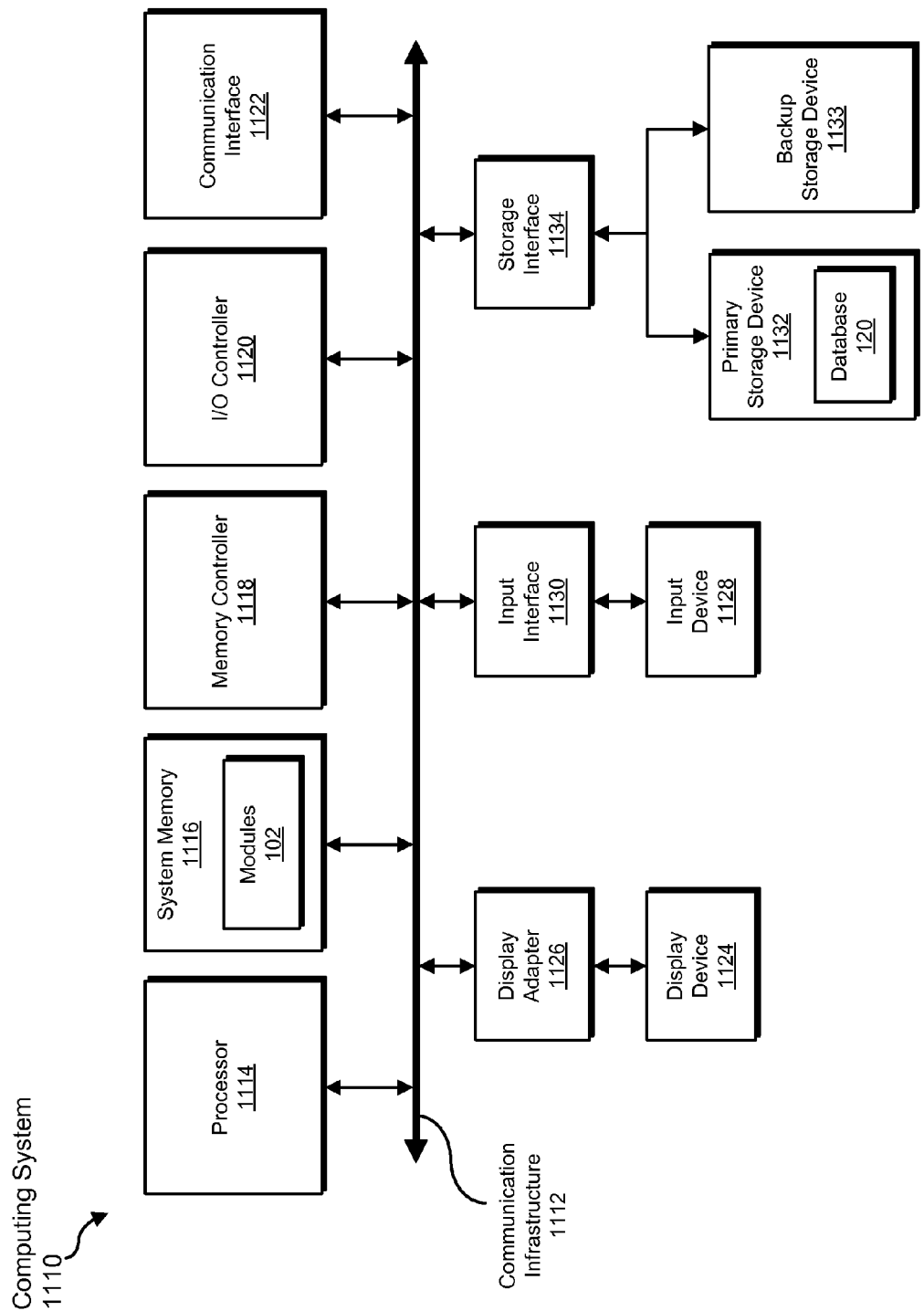
FIG. 11 is a block diagram of an exemplary computing system capable of implementing one or more of the embodiments described and/or illustrated herein.

FIG. 11 is a block diagram of an exemplary computing system 1110 capable of implementing one or more of the embodiments described and/or illustrated herein. For example, all or a portion of computing system 1110 may perform and/or be a means for performing, either alone or in combination with other elements, one or more of the steps described herein (such as one or more of the steps illustrated in FIG. 3). All or a portion of computing system 1110 may also perform and/or be a means for performing any other steps, methods, or processes described and/or illustrated herein.

Computing system 1110 broadly represents any single or multi-processor computing device or system capable of executing computer-readable instructions. Examples of computing system 1110 include, without limitation, workstations, laptops, client-side terminals, servers, distributed computing systems, handheld devices, or any other computing system or device. In its most basic configuration, computing system 1110 may include at least one processor 1114 and a system memory 1116.

Processor 1114 generally represents any type or form of physical processing unit (e.g., a hardware-implemented central processing unit) capable of processing data or interpreting and executing instructions. In certain embodiments, processor 1114 may receive instructions from a software application or module. These instructions may cause processor 1114 to perform the functions of one or more of the exemplary embodiments described and/or illustrated herein.

System memory 1116 generally represents any type or form of volatile or non-volatile storage device or medium capable of storing data and/or other computer-readable instructions. Examples of system memory 1116 include, without limitation, Random Access Memory (RAM), Read Only Memory (ROM), flash memory, or any other suitable memory device. Although not required, in certain embodiments computing system 1110 may include both a volatile memory unit (such as, for example, system memory 1116) and a non-volatile storage device (such as, for example, primary storage device 1132, as described in detail below). In one example, one or more of modules 102 from FIG. 1 may be loaded into system memory 1116.

In certain embodiments, exemplary computing system 1110 may also include one or more components or elements in addition to processor 1114 and system memory 1116. For example, as illustrated in FIG. 11, computing system 1110 may include a memory controller 1118, an Input/Output (I/O) controller 1120, and a communication interface 1122, each of which may be interconnected via a communication infrastructure 1112. Communication infrastructure 1112 generally represents any type or form of infrastructure capable of facilitating communication between one or more components of a computing device. Examples of communication infrastructure 1112 include, without limitation, a communication bus (such as an Industry Standard Architecture (ISA), Peripheral Component Interconnect (PCI), PCI Express (PCIe), or similar bus) and a network.

Memory controller 1118 generally represents any type or form of device capable of handling memory or data or controlling communication between one or more components of computing system 1110. For example, in certain embodiments memory controller 1118 may control communication between processor 1114, system memory 1116, and I/O controller 1120 via communication infrastructure 1112.

I/O controller 1120 generally represents any type or form of module capable of coordinating and/or controlling the input and output functions of a computing device. For example, in certain embodiments I/O controller 1120 may control or facilitate transfer of data between one or more elements of computing system 1110, such as processor 1114, system memory 1116, communication interface 1122, display adapter 1126, input interface 1130, and storage interface 1134.

Communication interface 1122 broadly represents any type or form of communication device or adapter capable of facilitating communication between exemplary computing system 1110 and one or more additional devices. For example, in certain embodiments communication interface 1122 may facilitate communication between computing system 1110 and a private or public network including additional computing systems. Examples of communication interface 1122 include, without limitation, a wired network interface (such as a network interface card), a wireless network interface (such as a wireless network interface card), a modem, and any other suitable interface. In at least one embodiment, communication interface 1122 may provide a direct connection to a remote server via a direct link to a network, such as the Internet. Communication interface 1122 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1122 may also represent a host adapter configured to facilitate communication between computing system 1110 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1122 may also allow computing system 1110 to engage in distributed or remote computing. For example, communication interface 1122 may receive instructions from a remote device or send instructions to a remote device for execution.

As illustrated in FIG. 11, computing system 1110 may also include at least one display device 1124 coupled to communication infrastructure 1112 via a display adapter 1126. Display device 1124 generally represents any type or form of device capable of visually displaying information forwarded by display adapter 1126. Similarly, display adapter 1126 generally represents any type or form of device configured to forward graphics, text, and other data from communication infrastructure 1112 (or from a frame buffer, as known in the art) for display on display device 1124.

As illustrated in FIG. 11, exemplary computing system 1110 may also include at least one input device 1128 coupled to communication infrastructure 1112 via an input interface 1130. Input device 1128 generally represents any type or form of input device capable of providing input, either computer or human generated, to exemplary computing system 1110. Examples of input device 1128 include, without limitation, a keyboard, a pointing device, a speech recognition device, or any other input device.

As illustrated in FIG. 11, exemplary computing system 1110 may also include a primary storage device 1132 and a backup storage device 1133 coupled to communication infrastructure 1112 via a storage interface 1134. Storage devices 1132 and 1133 generally represent any type or form of storage device or medium capable of storing data and/or other computer-readable instructions. For example, storage devices 1132 and 1133 may be a magnetic disk drive (e.g., a so-called hard drive), a solid state drive, a floppy disk drive, a magnetic tape drive, an optical disk drive, a flash drive, or the like. Storage interface 1134 generally represents any type or form of interface or device for transferring data between storage devices 1132 and 1133 and other components of computing system 1110. In one example, database 120 from FIG. 1 may be stored in primary storage device 1132.

In certain embodiments, storage devices 1132 and 1133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1132 and 1133 may also include other similar structures or devices for allowing computer software, data, or other computer-readable instructions to be loaded into computing system 1110. For example, storage devices 1132 and 1133 may be configured to read and write software, data, or other computer-readable information. Storage devices 1132 and 1133 may also be a part of computing system 1110 or may be a separate device accessed through other interface systems.

Many other devices or subsystems may be connected to computing system 1110. Conversely, all of the components and devices illustrated in FIG. 11 need not be present to practice the embodiments described and/or illustrated herein. The devices and subsystems referenced above may also be interconnected in different ways from that shown in FIG. 11. Computing system 1110 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 1110. All or a portion of the computer program stored on the computer-readable medium may then be stored in system memory 1116 and/or various portions of storage devices 1132 and 1133. When executed by processor 1114, a computer program loaded into computing system 1110 may cause processor 1114 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 1110 may be configured as an Application Specific Integrated Circuit (ASIC) adapted to implement one or more of the exemplary embodiments disclosed herein.

Figure 12:
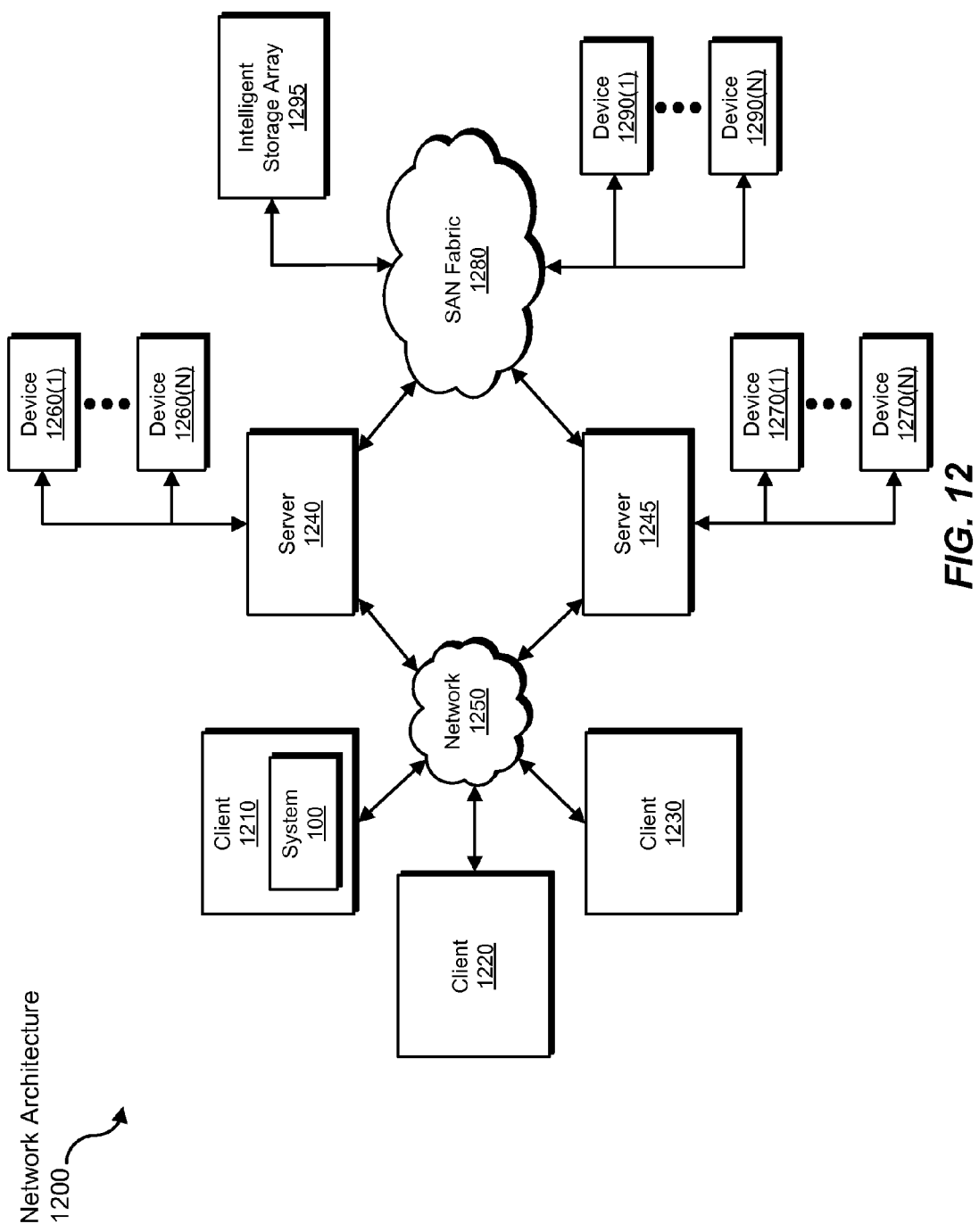
FIG. 12 is a block diagram of an exemplary computing network capable of implementing one or more of the embodiments described and/or illustrated herein.

FIG. 12 is a block diagram of an exemplary network architecture 1200 in which client systems 1210, 1220, and 1230 and servers 1240 and 1245 may be coupled to a network 1250. As detailed above, all or a portion of network architecture 1200 may perform and/or be a means for performing, either alone or in combination with other elements, one or more of the steps disclosed herein (such as one or more of the steps illustrated in FIG. 3). All or a portion of network architecture 1200 may also be used to perform and/or be a means for performing other steps and features set forth in the instant disclosure.

Client systems 1210, 1220, and 1230 generally represent any type or form of computing device or system, such as exemplary computing system 1110 in FIG. 11. Similarly, servers 1240 and 1245 generally represent computing devices or systems, such as application servers or database servers, configured to provide various database services and/or run certain software applications. Network 1250 generally represents any telecommunication or computer network including, for example, an intranet, a WAN, a LAN, a PAN, or the Internet. In one example, client systems 1210, 1220, and/or 1230 and/or servers 1240 and/or 1245 may include all or a portion of system 100 from FIG. 1.

As illustrated in FIG. 12, one or more storage devices 1260(1)-(N) may be directly attached to server 1240. Similarly, one or more storage devices 1270(1)-(N) may be directly attached to server 1245. Storage devices 1260(1)-(N) and storage devices 1270(1)-(N) generally represent any type or form of storage device or medium capable of storing data and/or other computer-readable instructions. In certain embodiments, storage devices 1260(1)-(N) and storage devices 1270(1)-(N) may represent Network-Attached Storage (NAS) devices configured to communicate with servers 1240 and 1245 using various protocols, such as Network File System (NFS), Server Message Block (SMB), or Common Internet File System (CIFS).

Servers 1240 and 1245 may also be connected to a Storage Area Network (SAN) fabric 1280. SAN fabric 1280 generally represents any type or form of computer network or architecture capable of facilitating communication between a plurality of storage devices. SAN fabric 1280 may facilitate communication between servers 1240 and 1245 and a plurality of storage devices 1290(1)-(N) and/or an intelligent storage array 1295. SAN fabric 1280 may also facilitate, via network 1250 and servers 1240 and 1245, communication between client systems 1210, 1220, and 1230 and storage devices 1290(1)-(N) and/or intelligent storage array 1295 in such a manner that devices 1290(1)-(N) and array 1295 appear as locally attached devices to client systems 1210, 1220, and 1230. As with storage devices 1260(1)-(N) and storage devices 1270(1)-(N), storage devices 1290(1)-(N) and intelligent storage array 1295 generally represent any type or form of storage device or medium capable of storing data and/or other computer-readable instructions.

In certain embodiments, and with reference to exemplary computing system 1110 of FIG. 11, a communication interface, such as communication interface 1122 in FIG. 11, may be used to provide connectivity between each client system 1210, 1220, and 1230 and network 1250. Client systems 1210, 1220, and 1230 may be able to access information on server 1240 or 1245 using, for example, a web browser or other client software. Such software may allow client systems 1210, 1220, and 1230 to access data hosted by server 1240, server 1245, storage devices 1260(1)-(N), storage devices 1270(1)-(N), storage devices 1290(1)-(N), or intelligent storage array 1295. Although FIG. 12 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1240, server 1245, storage devices 1260(1)-(N), storage devices 1270(1)-(N), storage devices 1290(1)-(N), intelligent storage array 1295, or any combination thereof. All or a portion of one or more of the exemplary embodiments disclosed herein may also be encoded as a computer program, stored in server 1240, run by server 1245, and distributed to client systems 1210, 1220, and 1230 over network 1250.

As detailed above, computing system 1110 and/or one or more components of network architecture 1200 may perform and/or be a means for performing, either alone or in combination with other elements, one or more steps of an exemplary method for using event-correlation graphs to generate remediation procedures.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive event-correlation graphs to be transformed, transform the event-correlation graphs into procedures for remediating effects of attacks reflected in the event-correlation graphs, output the procedures to an administrator, use the result of the transformation to recommend and/or apply the procedures, and store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for using event-correlation graphs to generate remediation procedures, at least a portion of the method being performed by at least one computing device comprising at least one processor, the method comprising:
   detecting, by the at least one computing device, a suspicious event involving a first actor within a computing system, wherein the suspicious event could not be individually classified as definitively malicious;
   constructing, by the at least one computing device in response to detecting the suspicious event involving the first actor, an event-correlation graph, wherein:
      the event-correlation graph comprises at least:
         a first node that represents the first actor;
         a second node that represents a second actor; and
         an edge that interconnects the first node and the second node and represents an additional suspicious event involving the first actor and the second actor;
      each suspicious event represented in the event-correlation graph could not be individually classified as definitively malicious;

calculating, by the at least one computing device based at least in part on the additional suspicious event involving the first actor and the second actor, an attack score for the event-correlation graph;

determining that the attack score is greater than a predetermined threshold;

determining, based at least in part on the attack score being greater than the predetermined threshold, that the suspicious event comprises an attack on the computing system;

using the event-correlation graph to generate a procedure for remediating an effect of the attack on the computing system.

2. The method of claim 1, further comprising recommending the procedure to at least one of:
   an administrator of the computing system;
   a user of the computing system.

3. The method of claim 1, wherein using the event-correlation graph to generate the procedure for remediating the effect of the attack on the computing system comprises:
   using the event-correlation graph to determine that security credentials were accessed during the attack;
   generating a procedure for resetting the security credentials.

4. The method of claim 1, wherein using the event-correlation graph to generate the procedure for remediating the effect of the attack on the computing system comprises:
   using the event-correlation graph to determine that a keylogger was executed on a computing device within the computing system on which security credentials were accessible;
   generating a procedure for resetting the security credentials.

5. The method of claim 1, wherein using the event-correlation graph to generate the procedure for remediating the effect of the attack on the computing system comprises:
   using the event-correlation graph to determine that a domain controller was infected during the attack;
   generating a procedure for resetting security credentials managed by the domain controller.

6. The method of claim 1, wherein using the event-correlation graph to generate the procedure for remediating the effect of the attack on the computing system comprises:
   using the event-correlation graph to determine that an actor involved in the attack is external to the computing system;
   generating a procedure for adding the external actor to a blacklist.

7. The method of claim 1, wherein using the event-correlation graph to generate the procedure for remediating the effect of the attack on the computing system comprises:
   using the event-correlation graph to determine that a benign application was involved in the attack;
   generating a procedure for improving the security of the benign application.

8. The method of claim 1, wherein using the event-correlation graph to generate the procedure for remediating the effect of the attack on the computing system comprises:
   using the event-correlation graph to determine that a nonessential benign application was involved in the attack;
   generating a procedure for reducing use of the nonessential benign application.

9. The method of claim 1, wherein using the event-correlation graph to generate the procedure for remediating the effect of the attack on the computing system comprises:
   using the event-correlation graph to determine that a hacking tool was involved in the attack;
   generating a procedure for removing the hacking tool.

10. The method of claim 1, wherein using the event-correlation graph to generate the procedure for remediating the effect of the attack on the computing system comprises:
    using the event-correlation graph to determine that an actor involved in the attack made modifications to a file system;
    generating a procedure for undoing the modifications to the file system.

11. The method of claim 1, wherein using the event-correlation graph to generate the procedure for remediating the effect of the attack on the computing system comprises:
    using the event-correlation graph to determine that an actor involved in the attack made modifications to a registry;
    generating a procedure for undoing the modifications to the registry.

12. The method of claim 1, wherein using the event-correlation graph to generate the procedure for remediating the effect of the attack on the computing system comprises:
    using the event-correlation graph to determine that unencrypted communications occurred during the attack;
    notifying an administrator of the unencrypted communications that occurred during the attack.

13. The method of claim 1, wherein:
    the attack comprises a phishing attack;
    using the event-correlation graph to generate the procedure for remediating the effect of the attack on the computing system comprises:
      using the event-correlation graph to identify at least one user involved in the phishing attack;
      performing at least one of:
        notifying an administrator of the user involved in the phishing attack;
        generating a procedure for educating the user about phishing attacks.

14. The method of claim 1, wherein calculating the attack score for the event-correlation graph comprises:
    calculating a score for each edge within the event-correlation graph based at least in part on a suspiciousness score associated with the suspicious event represented by the edge;
    summing the scores of each edge within the event-correlation graph.

15. The method of claim 1, wherein calculating the attack score for the event-correlation graph comprises:
    calculating a score for each node within the event-correlation graph based at least in part on a suspiciousness score associated with each suspicious event associated with the node;
    summing the scores of each node within the event-correlation graph.

16. A system for using event-correlation graphs to generate remediation procedures, the system comprising:
    a detecting module, stored in memory, that detects a suspicious event involving a first actor within a computing system, wherein the suspicious event could not be individually classified as definitively malicious;
    a constructing module, stored in memory, that:
      constructs, in response to detecting the suspicious event involving the first actor, an event-correlation graph, wherein:
        the event-correlation graph comprises at least:
          a first node that represents the first actor;
          a second node that represents a second actor; and an edge that interconnects the first node and the second node and represents an additional suspicious event involving the first actor and the second actor;

each suspicious event represented in the event-correlation graph could not be individually classified as definitively malicious;

calculates, based at least in part on the additional suspicious event involving the first actor and the second actor, an attack score for the event-correlation graph;

determines that the attack score is greater than a predetermined threshold;

determines, based at least in part on the attack score being greater than the predetermined threshold, that the suspicious event comprises an attack on the computing system;

a remediating module, stored in memory, that uses the event-correlation graph to generate a procedure for remediating an effect of the attack on the computing system;

at least one processor that executes the detecting module, the constructing module, and the remediating module.

17. The system of claim 16, further comprising a recommending module, stored in memory, that recommends the procedure to at least one of:

an administrator of the computing system;

a user of the computing system.

18. The system of claim 16, wherein the remediating module uses the event-correlation graph to generate the procedure for remediating the effect of the attack on the computing system by:

using the event-correlation graph to determine that security credentials were accessed during the attack;

generating a procedure for resetting the security credentials.

19. The system of claim 16, wherein the computing system comprises a live production system.

20. A non-transitory computer-readable medium comprising one or more computer-executable instructions that, when executed by at least one processor of a computing device, cause the computing device to:

detect a suspicious event involving a first actor within a computing system, wherein the suspicious event could not be individually classified as definitively malicious;

construct, in response to detecting the suspicious event involving the first actor, an event-correlation graph, wherein:

the event-correlation graph comprises at least:

a first node that represents the first actor;

a second node that represents a second actor; and an edge that interconnects the first node and the second node and represents an additional suspicious event involving the first actor and the second actor;

each suspicious event represented in the event-correlation graph could not be individually classified as definitively malicious;

calculate, based at least in part on the additional suspicious event involving the first actor and the second actor, an attack score for the event-correlation graph;

determine that the attack score is greater than a predetermined threshold;

determine, based at least in part on the attack score being greater than the predetermined threshold, that the suspicious event comprises an attack on the computing system;

use the event-correlation graph to generate a procedure for remediating an effect of the attack on the computing system.

* * * * *